(12) United States Patent
Bravo et al.

(10) Patent No.: US 12,193,457 B2
(45) Date of Patent: *Jan. 14, 2025

(54) FEED ADDITIVE COMPOSITIONS AND METHODS

(71) Applicant: PMI Nutrition, LLC, Arden Hills, MN (US)

(72) Inventors: David M. Bravo, Yverdon-les-bains (CH); Karin Berger Büter, Uttwil (CH); Bernhard Büter, Uttwil (CH)

(73) Assignee: PMI NUTRITION, LLC, Arden Hills, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/955,268

(22) Filed: Sep. 28, 2022

(65) Prior Publication Data
US 2023/0134934 A1    May 4, 2023

Related U.S. Application Data

(60) Provisional application No. 63/251,382, filed on Oct. 1, 2021.

(51) Int. Cl.
*A23K 20/121* (2016.01)
*A23K 10/30* (2016.01)
*A23K 50/75* (2016.01)

(52) U.S. Cl.
CPC ............ *A23K 20/121* (2016.05); *A23K 10/30* (2016.05); *A23K 50/75* (2016.05)

(58) Field of Classification Search
CPC ...... A23K 10/30; A23K 50/75; A23K 20/126; A23K 20/121; A23K 50/10; A23K 50/30

(Continued)

(56) References Cited

U.S. PATENT DOCUMENTS

| | | |
|---|---|---|
| 6,440,447 B1 | 8/2002 | Luhman |
| 10,751,282 B2 | 8/2020 | Ragot et al. |

(Continued)

FOREIGN PATENT DOCUMENTS

| | | |
|---|---|---|
| CN | 112335792 | 2/2021 |
| WO | 2014020138 A2 | 2/2014 |
| WO | 2016118027 | 7/2016 |

OTHER PUBLICATIONS

Schlemper et al. Ciência Rural, v.51, n.12, 2021.published Jul. 26, 2021 (Year: 2021).*

(Continued)

*Primary Examiner* — Subbalakshmi Prakash
(74) *Attorney, Agent, or Firm* — Dentons US LLP

(57) ABSTRACT

The present disclosure provides a feed additive for domesticated animals that is capable of increasing feed performance, as well as associated methods for promoting growth and zootechnical performance in domesticated animals. The animal feed additive provided contains marrubiin, related compounds or biologically acceptable salts thereof, and in some embodiments Total Lignans standardized in the contents of Furoguaiacin-like compounds and Guaiacin-like compounds. The present disclosure also describes methods for improving growth via the dietary inclusion of marrubiin, related compounds or biologically acceptable salts thereof, and in certain embodiments Total Lignans standardized in Furoguaiacin-like compounds and Guaiacin-like compounds.

14 Claims, 13 Drawing Sheets

(58) Field of Classification Search
USPC .......................................................... 426/54
See application file for complete search history.

(56) References Cited

U.S. PATENT DOCUMENTS

| | | | |
|---|---|---|---|
| 2002/0110605 A1 | 8/2002 | Nakagiri et al. |
| 2007/0231417 A1 | 10/2007 | Geske |
| 2012/0083525 A1 | 4/2012 | Oh et al. |
| 2015/0056255 A1 | 2/2015 | Ragot et al. |
| 2017/0035829 A1 | 2/2017 | Jia et al. |
| 2017/0333358 A1 | 11/2017 | Stegemann et al. |
| 2020/0093158 A1 | 3/2020 | Calabotta et al. |
| 2023/0053138 A1 | 2/2023 | Bravo et al. |
| 2023/0145341 A1 | 5/2023 | Bravo et al. |
| 2024/0268416 A1 | 8/2024 | Bravo et al. |

OTHER PUBLICATIONS

Aćimović, et al. Marrubium vulgare L.: A Phytochemical and Pharmacological Overview. Molecules 25(12), 2020, 2898.

Amri, et al. Marrubium vulgare L. Leave Extract: Phytochemical Composition, Antioxidant and Wound Healing Properties. Molecules 22(11), 2017, 1851.

Andersen-Civil, et al. "Modulation of inflammatory responses in RAW 264.7 macrophages by purified condensed tannins and possible implication in a parasitized mouse-model", Polyphenols Communications 2021, 66-67, 2021.

Bravo, et al. Evaluation of a mixture of carvacrol, cinnamaldehyde, and capsicum oleoresin for improving growth. Performance and metabolizable energy in broiler chicks fed corn and soybean meal. Journal of Applied Poultry Research 20(2), 2011, pp. 115-120.

De Jesus, et al. Analysis of the antinociceptive properties of marrubiin isolated from Marrubium vulgare. Phytomedicine 7(2), 2000, pp. 111-115.

El Bardai, et al. The Vasorelaxant Activity of Marrubenol and Marrubiin from Marrubium vulgare. Planta Med 2003 69(1), 2003, pp. 75-77.

European Food Safety Authority. Scientific Opinion on the safety and efficacy of XTRACT® Evolution-B, Code X60-6930 (carvacrol, cinnamaldehyde and capsicum oleoresin), as a feed additive for chickens for fattening. EFSA Journal 13(2), 2015, 4011.

Ishikawa, et al. Volatile Sulfur Production in the Large Intestine as Affected by Plant Extracts in Pig In Vitro Model. Bioscience Microflora 20(2), 2001, pp. 49-52.

Masoodi, et al. Labdane diterpenoids from Marrubium vulgare. Phytochemistry Letters 13, 2015, pp. 275-279.

Meyre-Silva, et al. Analgesic potential of marrubiin derivatives, a bioactive diterpene present in *Marrubium vulgare* (Lamiaceae). IL Farmaco 60(4), 2005, pp. 321-326.

Mnonopi, et al. The cardioprotective effects of marrubiin, a diterpenoid found in Leonotis leonurus extracts. Journal of Ethnopharmacology 138(1), 2011, pp. 67-75.

Mnonopi, et al. Marrubiin, a constituent of Leonotis leonurus, alleviates diabetic symptoms. Phytomedicine 19(6), 2012, pp. 488-493.

Moussouni, et al. In-vitro Anthelmintic Effects of Aqueous and Ethanolic Extracts of Marrubium vulgare Leaves Against Bovine Digestive Strongyles. Turkiye Parazitol Derg 42(4), 2018, pp. 262-267.

Oliveira, et al. Gastroprotective activity of methanol extract and marrubiin obtained from leaves of *Marrubium vulgare* L. (Lamiaceae). Journal of Pharmacy and Pharmacology 63(9), 2011, pp. 1230-1237.

Pilkington. Lignans: A Chemometric Analysis. Molecules 23(7), 2018, 1666.

Pubchem, Substance Record for SID 179212191, Available Date: Jun. 2, 2014 [retrieved on Sep. 19, 2022].

Invitation to Pay Additional Fees regarding International App. No. PCT/US22/77286, mailed Nov. 8, 2022.

International Search Report and Written Opinion regarding International App. No. PCT/US22/77286, mailed Jan. 19, 2023.

Invitation to Pay Additional Fees regarding International App. No. PCT/US22/38510, mailed Sep. 28, 2022.

International Search Report and Written Opinion regarding International App. No. PCT/US22/38510, mailed Jan. 17, 2023.

International Search Report and Written Opinion regarding International App. No. PCT/US22/78034, mailed Jan. 11, 2023.

Johansson et al., Variability in oil content and fatty acid composition in wild northern currants, European Food Research and Technology 211(4); 277-283, 2000.

Kratochvil, et al. "Isolation and characterization of α-guaiaconic acid and the nature of guaiacum blue". Phytochemistry, vol. 10(10), pp. 2529-2531, (1971).

Lillehoj, et al. "Phytochemicals as antibiotic alternatives to promote growth and enhance host health". Vet Res 49, 76 (2018).

Nakano, et al. "Lignans from guaiac resin decrease nitric oxide production in interleukin 1β-treated hepatocytes". J Nat Med 71, 190-197 (2017).

Yoshikawa, et al. "Lignan compounds and 4,4'-dihydroxybiphenyl protect C2C12 cells against damage from oxidative stress". Biochemical and Biophysical Research Communications, vol. 344(1), pp. 394-399, (2006).

Zhang, et al. "A Brief Review of Phenolic Compounds Identified from Plants: Their Extraction, Analysis, and Biological Activity". Natural Product Communications, vol. 17(1), 1-14, (2022).

Stalazs. "Occurrence and distribution of Cecidophyopsis mites on different currant cultivars and species in Latvia." IOBC/WPRS Bulletin, vol. 70, pp. 93-95, (2011).

\* cited by examiner

FEED ADDITIVE COMPOSITIONS AND METHODS

REFERENCE TO RELATED APPLICATION

This application claims the benefit of U.S. Provisional Application No. 63/251,382, filed Oct. 1, 2021, which is herein incorporated by reference in its entirety.

FIELD OF THE INVENTION

The present disclosure relates to the field of animal feed additives, and more specifically to compositions and methods for improving performance of domesticated animals.

BACKGROUND OF THE INVENTION

The world population is predicted to double in the next 20 years which doubles the needed quantity of food from animal origin. This is a challenge that was addressed before as in the second part of the 20 the century, food from animal origin was already doubled. However, where the challenge is similar, the means to achieve it are profoundly different. Indeed, in the 20th century, the spectacular increase of animal production was made possible by progress in the form of classical nutrition, farm management, genetics and quasi systematic use of antibiotic and chemical compounds. Today, the banned use of antibiotics in animal feed in some countries, a limitation on therapeutic drugs at the farm level in other countries, and everywhere an increased use of non-traditional feedstuffs in the farm animal diet are undoubtedly changing the interaction between the diet and the farm animal, resulting in a diet that is much more trouble causing than in the recent past. Today, not only does the food from animal origin need to double, it also has to be done while respecting animal welfare, as well as taking into account consumers escalating expectations for environment and drug free feed.

There is therefore a great need in the art for development of feed additives that could supplant the need for antibiotics and other ingredients while improving performance of farm animals in a drug free context.

SUMMARY

The present disclosure provides, in one embodiment, an animal feed ingredient composition comprising an effective amount of marrubiin or a related compound, including, but not limited to, marrubiin-like diterpenes such as marrubiinic acid, marrubenol, 12-S-hydroxymarrubiin, 11-oxo-marrubiin, premarrubiin, 3-deoxo-15-S-methocyvelutein, marrilibalacetal, cyllenin A, polydinonine, preleosibirin, or peregrinol, or biologically acceptable salts thereof, wherein the effective amount improves the performance of an animal feed to which the ingredient is added. As used herein, "animal" refers to all animals except humans. Examples of animals are non-ruminants, and ruminants. Ruminant animals include, for example, animals such as sheep, goats, cattle, e.g. beef cattle, dairy cows, cows, and young calves, deer, camel, llama and kangaroo. Non-ruminant animals include mono-gastric animals, e.g. pigs or swine (including, but not limited to, piglets, growing pigs, and sows); poultry such as turkeys, ducks and chickens (including but not limited to broiler chicks, layers); horses (including, but not limited to, hot bloods, cold bloods and warm bloods), fish (including but not limited to amberjack, arapaima, barb, bass, bluefish, bocachico, bream, bullhead, cachama, carp, catfish, catla, chanos, char, cichlid, cobia, cod, crappie, dorada, drum, eel, goby, goldfish, gourami, grouper, guapote, halibut, java, labeo, lai, loach, mackerel, milkfish, mojarra, mudfish, mullet, paco, pearlspot, pejerrey, perch, pike, pompano, roach, salmon, sampa, sauger, sea bass, seabream, shiner, sleeper, snakehead, snapper, snook, sole, spinefoot, sturgeon, sunfish, sweetfish, tench, terror, tilapia, trout, tuna, turbot, vendace, walleye and whitefish); and crustaceans (including but not limited to shrimps and prawns). Included among such animals that may find use in accordance with the invention are pets, including, but not limited to, dogs and cats.

Biologically acceptable salts that may find use in the present disclosure include, but are not limited to, acid addition salts formed with biologically acceptable acids, examples of which include hydrochloride, hydrobromide, sulphate or bisulphate, phosphate or hydrogen phosphate, acetate, benzoate, succinate, fumarate, maleate, lactate, citrate, tartrate, gluconate; methanesulphonate, benzenesulphonate and p-toluenesulphonic acid, alkali metal salts, with bases, examples of which include the sodium and potassium salts.

In certain embodiments, an animal feed provided herein comprises at least one animal feed component selected from the group consisting of a vitamin, a mineral, a probiotic, an enzyme, a flavoring, an amino acid, a fat, an essential oil and a preservative, or any combination thereof. Non-limiting examples of a vitamin include, for example, fat-soluble vitamins including vitamin A, vitamin D3, vitamin E, and vitamin K, e.g., vitamin K3; and water-soluble vitamins including vitamin B12, biotin and choline, vitamin B1, vitamin B2, vitamin B6, niacin, folic acid and panthothenate, e.g., Ca-D-panthothenate, and combinations thereof. Non-limiting examples of a mineral include, for example, calcium, magnesium, potassium and sodium, and trace minerals include boron, cobalt, chloride, chromium, copper, fluoride, iodine, iron, manganese, molybdenum, selenium and zinc. Non-limiting examples of a probiotic include, for example, *Bacillus subtilis, Bacillus licheniformis, Bacillus amyloliquefaciens, Bacillus cereus, Bacillus pumilus, Bacillus polymyxa, Bacillus megaterium, Bacillus coagulans, Bacillus circulans, Bifidobacterium bifidum, Bifidobacterium animalis, Bifidobacterium sp., Carnobacterium sp., Clostridium butyricum, Clostridium sp., Enterococcus faecium, Enterococcus sp., Lactobacillus sp., Lactobacillus acidophilus, Lactobacillus farciminus, Lactobacillus rhamnosus, Lactobacillus reuteri, Lactobacillus salivarius, Lactococcus lactis, Lactococcus sp., Leuconostoc sp., Megasphaera elsdenii, Megasphaera sp., Pediococcus acidilactici, Pediococcus sp., Propionibacterium thoenii, Propionibacterium sp.* and *Streptococcus* sp. or any combination thereof. Non-limiting examples of an enzyme include, for example, acetylxylan esterase, acylglycerol lipase, amylase, alpha-amylase, beta-amylase, arabinofuranosidase, cellobiohydrolases, cellulase, feruloyl esterase, galactanase, alpha-galactosidase, beta-galactosidase, beta-glucanase, beta-glucosidase, lysophospholipase, lysozyme, alpha-mannosidase, beta-mannosidase (mannanase), phytase, phospholipase A1, phospholipase A2, phospholipase D, protease, pullulanase, pectinesterase, triacylglycerol lipase, xylanase, beta-xylosidase or any combination thereof. Non-limiting examples of a flavoring include, for example, a floral, berry, nutty, caramel, chocolate, peppery, smoky, cheesy or meaty flavor, mints such as peppermint, citrus flavors such as orange and lemon, artificial vanilla, cinnamon and various fruit flavors. Non-limiting examples of an amino acid include, for example, alanine (Ala; A), arginine (Arg; R), asparagine (Asn; N), aspartic acid (aspartate, Asp; D), cysteine (Cys; C), glutamine (Gln; Q), glutamic acid (glutamate, Glu; E), glycine (Gly; G), histidine (His; H), isoleucine (Ile; I), leucine (Leu; L), lysine (Lys; K), methionine (Met; M), phenylalanine (Phe; F), proline (Pro; P), serine (Ser; S), threonine (Thr; T), tryptophan (Trp; W), tyrosine (Tyr; Y) and valine (Val; V), and any combination thereof. Non-limiting examples of a preservative include, for example, sodium sorbate, potassium sorbate, sodium benzoate and potassium benzoate, and combinations thereof.

In some embodiments, the marrubiin or related compounds are obtained from a *Marrubium vulgare*, *Marrubium velatinum*, *Marrubium cylleneum*, *Marrubium trachyticum*, *Marrubium globosum*, *Marrubium anisodon*, *Marrubium sericeum*, *Marrubium supinum*, *Leonotis leonurus*, *Leonotis nepetifolia*, *Phlomis bracteosa*, *Marrubium deserti de Noe*, *Marrubium alysson*, or *Marrubium thessalum* plant or plant part, an extract thereof, or any combination thereof. In particular embodiments, the marrubiin or related compounds are obtained from the aerial parts of a *Marrubium vulgare* plant, or an extract thereof. In certain embodiments, the marrubiin or related compounds are obtained from an extract from a plant, part thereof, or any combination of parts thereof. In further embodiments, the extract is produced from stems, leaf, flowers, branches, roots or fruits of a plant or part thereof, or any combination thereof. In yet further embodiments, the extract is an aqueous, ethanolic, methanolic, isopropanolic, ethylacetate, acetonic, or hexane extract, or mixtures thereof, or a supercritical $CO_2$ extract. In some embodiments, the marrubiin or related compounds are synthetically produced. In additional embodiments the marrubiin related compound is marrubiinic acid, marrubenol, 12-S-hydroxymarrubiin, 11-oxo-marrubiin, premarrubiin, 3-deoxo-15-S-methocyvelutein, marrilibalacetal, cyllenin A, polydinonine, preleosibirin, or peregrinol marrubiinic acid or marrubenol.

In certain embodiments, the marrubiin has the chemical structure:

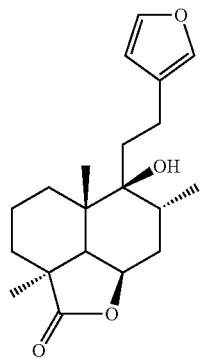

or a biologically acceptable salt thereof.

In other embodiments of a composition provided herein, marrubiin or related compounds comprise between about 0.5% and 100% of the composition, including, for example, at least about 0.7% of the composition. In some embodiments the marrubiin or related compounds comprise between about 0.5% and about 99%, between about 0.5% and about 95% of the composition, between about 0.5% and about 90% of the composition, between about 1% and about 80% of the composition, about 0.5% and about 75%, about 0.5% and about 70%, about 0.5% and about 60%, about 0.5% and about 50%, about 0.5% and about 40%, about 0.5% and about 30%, about 0.5% and about 25%, about 0.5% and about 20%, about 0.5% and about 15%, about 0.5% and about 10%, about 0.5% and about 7%, about 0.5% and about 5%, about 0.5% and about 2.5%, about 0.5% and about 1%, between about 2.5% and 100% of the composition, between about 5% and 100%, between about 7% and 100%, between about 10% and 100%, between about 15% and 100%, between about 20% and 100%, between about 25% and 100%, between about 30% and 100%, between about 40% and 100%, between about 50% and 100%, between about 60% and 100%, between about 70% and 100%, between about 75% and 100%, between about 80% and 100%, between about 90% and 100%, between about 95% and 100%, or between about 99% and 100%, about 0.7% and about 99%, about 1% and about 95%, about 2.5% and about 90%, about 5% and about 80%, about 7.5% and about 75%, about 10% and about 70%, about 20% and about 60%, about 25% and about 50%, or about 30% and about 40%, of the composition. In other embodiments, marrubiin or related compounds in said composition comprise at least 0.5%. 0.7, 0.75%, 1%, 2.5%, 5%, 7%, 7.5%, 10%, 15%, 20%, 25%, 30%, 40%, 50%, 60%, 70%, 75%, 80%, 90%, 95%, 99% or 100% of said composition.

In still other embodiments, the present disclosure provides an animal feed ingredient composition comprising an effective amount of one or more plant parts from at least a first *Marrubium* plant, or an extract thereof, wherein the effective amount improves the performance of an animal feed to which the ingredient is added. In certain embodiments the one or more plant parts comprise a whole plant. In some embodiments the one or more plant parts comprise a stem, leaf, flower, root, fruit, or cell of said plant, or any combination thereof. In additional embodiments the one or more plant parts comprise at least two different plant parts. In other embodiments the one or more plant parts comprise plant parts from at least two different plants. In yet other embodiments the one or more plant parts comprise plant parts from plants of the same *Marrubium* species. In further embodiments the one or more plant parts comprise plant parts from two or more different *Marrubium* species. In still further embodiments the one or more plant parts are obtained from the aerial parts of a *Marrubium vulgare* plant, or an extract thereof. In some embodiments the one or more plant parts are ground to a powder or granule. In various embodiments the *Marrubium* plant is a species selected from the group consisting of a *Marrubium vulgare*, *Marrubium velatinum*, *Marrubium cylleneum*, *Marrubium trachyticum*, *Marrubium globosum*, *Marrubium anisodon*, *Marrubium sericeum*, *Marrubium supinum*, *Marrubium deserti de Noe*, *Marrubium alysson*, and *Marrubium thessalum* plant, or wherein the composition comprises plant parts from any combination of species thereof.

In certain embodiments the composition is further defined as comprising at least one animal feed component selected from the group consisting of a vitamin, mineral, probiotic, enzyme, flavoring, amino acid, fat, essential oil and preservative, or any combination thereof. In some embodiments the extract is an aqueous, ethanolic, methanolic, isopropanolic, ethylacetate, acetonic, hexane, or a mixture thereof, or a supercritical $CO_2$ extract. In other embodiments the composition is further defined as comprising marrubiin. In particular embodiments marrubiin comprises at least 0.5% of the composition. In yet other embodiments marrubiin comprises between about 0.5% and 100% of the composition.

In additional embodiments the composition is further defined as comprising a furoguaiacin or a furoguaiacin-like compound or guaiacin or a guaiacin-like compound, or a biologically acceptable salt thereof. In certain embodiments the furoguaiacin or furoguaiacin-like compound or guaiacin or a guaiacin-like compound, or biologically acceptable salt thereof is present in an amount effective to improve the performance of an animal feed to which the ingredient is added relative to when said furoguaiacin or furoguaiacin-like compound or guaiacin or a guaiacin-like compound, or biologically acceptable salt thereof, is not present in the animal feed. In some embodiments the furoguaiacin or furoguaiacin-like compound or guaiacin or guaiacin-like compound is obtained from a *Machilus edulis, Persea fructifera, Machilus thunberghii, Cinnamomum philippense, Saurus cernuus, Myristica fragrans, Guaiacum sanctum* or *Guaiacum officinale* plant or plant part, or an extract thereof. In other embodiments the furoguaiacin or furoguaiacin-like compound or guaiacin or guaiacin-like compound is obtained from heartwood or branches of a *Guaiacum sanctum* or *Guaiacum officinale* plant, or an extract thereof. In yet other embodiments the furoguaiacin or furoguaiacin-like compound or guaiacin or guaiacin-like compound is obtained from an extract from a plant or part thereof. In still other embodiments the extract is produced from heartwood, whole trunk, bark, stems, leaf, flowers, branches, roots or fruits of a plant or part thereof, or any combination thereof. In further embodiments the extract is an aqueous, ethanolic, methanolic, isopropanolic, ethylacetate, acetonic, hexane, or a mixture thereof, or a supercritical $CO_2$ extract.

In particular embodiments the furoguaiacin or furoguaiacin-like compound or guaiacin or guaiacin-like compound is synthetically produced. In some embodiments the furoguaiacin-like compound or guaiacin-like has the chemical structure:

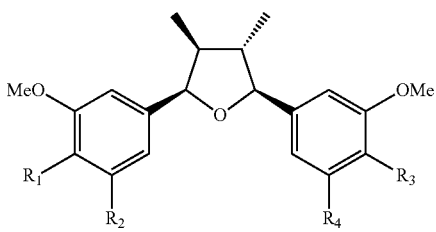

wherein R1 is —OH, —OCH3 or —OCH2, R2 is —OCH3 or —O, R3 is —OCH2 or —O, and R4 is —O or OCH3, and the corresponding glycosidic forms. In other embodiments the furoguaiacin or furoguaiacin-like compound or guaiacin or guaiacin-like compound corresponds to peaks with retention times of about 12.5 minutes, 16.5 minutes, 18.8 minutes, 20.5 minutes, 26.3 minutes, 26.8 minutes, 34.7 minutes, 35.6 minutes, 36.8 minutes, 39.1 minutes, 41.9 minutes, 43.9 minutes, 44.6 minutes, 45.0 minutes, 46.3 minutes, 48.2 minutes, 50.7 minutes, 53.5 minutes, 54.6 minutes, and 61.1 minutes on an HPLC chromatogram of an ethanol extract of heartwood or branches of a *Guaiacum sanctum* plant.

In certain embodiments lignans comprise between about 0.5% and about 30% of the composition. In other embodiments lignans comprise at least 9% of the composition. In further embodiments total lignans in the composition comprise at least 20% furoguaiacin or furoguaiacin-like compounds and guaiacin or guaiacin-like compounds. In yet further embodiments the guaiacin or guaiacin-like compound makes up from about 20% to about 60% of total lignans comprised in the composition by weight. In still further embodiments the furoguaiacin or furoguaiacin-like compound makes up from about 20% to about 60% of total lignans comprised in the composition by weight.

In certain embodiments the present disclosure provides an animal feed comprising an animal feed ingredient described herein in an amount effective to improve zootechnical performance in an animal fed the animal feed relative to a control feed lacking said animal feed ingredient composition. In certain embodiments, the animal feed is a chicken feed, pig feed, dairy cow feed, or beef cattle feed. In specific embodiments, the improved zootechnical performance is altered feed intake, increased average daily weight gain, increased feed efficiency, decreased feed conversion ratio or increased milk yield.

The term "feed conversion ratio" as used herein refers the amount of feed fed to an animal to increase the weight of the animal by a specified amount. An improved feed conversion ratio means a lower or decreased feed conversion ratio. By "lower or decreased feed conversion ratio" or "improved feed conversion ratio" it is meant that the use of a feed additive composition in feed results in a lower amount of feed being required to be fed to an animal to increase the weight of the animal by a specified amount compared to the amount of feed required to increase the weight of the animal by the same amount when the feed does not comprise the feed ingredient or additive composition.

The term "feed efficiency" refers to the amount of weight gain per unit of feed when the animal is fed ad-libitum or a specified amount of food during a period of time. By "increased feed efficiency" it is meant that the use of a feed additive composition according the present invention in feed results in an increased weight gain per unit of feed intake compared with an animal fed without the feed ingredient or additive composition being present.

In various embodiments, the marrubiin or related compounds, or biologically acceptable salts thereof, is present in an amount of from about 0.5 mg to about 160 mg per kg of animal feed. In some embodiments, the marrubiin or related compounds, or biologically acceptable salts thereof, is present in an amount of from about 0.5 mg to about 150 mg, about 0.5 mg to about 125 mg, about 0.5 mg to about 100 mg, about 0.5 mg to about 75 mg, about 0.5 mg to about 50 mg, about 0.5 mg to about 25 mg, about 0.5 mg to about 10 mg, about 0.5 mg to about 7.5 mg, about 0.5 mg to about 5 mg, about 0.5 mg to about 2.5 mg, about 0.5 mg to about 1 mg, about 0.5 mg to about 0.75 mg, about 1 mg to about 160 mg, about 2.5 mg to about 160 mg, about 5 mg to about 160 mg, about 7.5 mg to about 160 mg, about 10 mg to about 160 mg, about 25 mg to about 160 mg, about 50 mg to about 160 mg, about 75 mg to about 160 mg, about 100 mg to about 160 mg, about 125 mg to about 160 mg, about 150 mg to about 160 mg, about 1 mg to about 150 mg, about 2.5 mg to about 125 mg, about 5 mg to about 100 mg, about 7.5 mg to about 75 mg, or about 10 mg to about 50 per kg of animal feed. In certain embodiments the marrubiin or related compounds, or biologically acceptable salts thereof, is present in an amount of about 1.6 mg per kg of animal feed. In other embodiments the marrubiin or related compounds, or biologically acceptable salts thereof, is present in an amount of about 0.5 mg, about 1 mg, about 2.5 mg, about 5 mg, about 7.5 mg, about 10 mg, about 25 mg, about 50 mg, about 75 mg, about 100 mg, about 125 mg, about 150 mg, or about 160 mg per kg of animal feed.

In some embodiments, the marrubiin or related compounds are obtained from a *Marrubium vulgare, Marrubium velatinum, Marrubium cylleneum, Marrubium trachyticum, Marrubium globosum, Marrubium anisodon, Marrubium*

*sericeum, Marrubium supinum, Leonotis leonurus, Leonotis nepetifolia, Phlomis bracteosa, Marrubium deserti de Noe, Marrubium alysson,* or *Marrubium thessalum* plant or plant part, or an extract thereof. In other embodiments, the marrubiin or related compounds are obtained from the aerial parts of a *Marrubium vulgare* plant, including, but not limited to, stems, leaves, petioles, flowers, fruits and seeds of a *Marrubium vulgare* plant, or an extract thereof.

In still another embodiment, the present disclosure provides a method of improving the performance of an animal feed comprising adding an effective amount of a composition comprising marrubiin or related compounds as described herein, or biologically acceptable salts thereof, to the animal feed. In certain embodiments, the improved performance comprises altered feed intake, increased average daily weight gain, increased feed efficiency, decreased feed conversion ratio or increased milk yield in an animal fed said animal feed relative to a control animal feed to which the animal feed ingredient composition has not been added. In various embodiments, the animal feed is chicken feed, pig feed, dairy cow feed, or beef cattle feed.

In further embodiments the present disclosure provides a method of improving the performance of an animal feed, comprising adding an effective amount of a composition disclosed herein to the animal feed. In certain embodiments the improved performance comprises altered feed intake, increased average daily weight gain, increased feed efficiency, decreased feed conversion ratio or increased milk yield in an animal fed the animal feed relative to a control animal feed to which the animal feed ingredient composition has not been added. In some embodiments the animal feed is chicken feed, pig feed, dairy cow feed, or beef cattle feed. In yet other embodiments the marrubiin, or biologically acceptable salt thereof, is present in an amount of from about 0.5 mg to about 160 mg per kg of animal feed.

In still yet another embodiment, the present disclosure also provides a method of improving the zootechnical performance of an animal comprising feeding the animal feed disclosed herein to the animal. In some embodiments, the animal is a chicken, pig, dairy cow or beef cattle. In other embodiments, the improved zootechnical performance is altered feed intake, increased average daily weight gain, increased feed efficiency, decreased feed conversion ratio or increased milk yield. In further embodiments the animal feed comprises marrubiin, or a biologically acceptable salt thereof, in an amount of from about 0.5 mg to about 160 mg per kg of animal feed. In yet other embodiments the furoguaiacin or furoguaiacin-like compound or guaiacin or guaiacin-like compound, or biologically acceptable salt thereof, is present in an amount of from about 0.01 mg to about 2000 mg per kg of animal feed. In still other embodiments the animal feed comprises the furoguaiacin or the furoguaiacin-like compound or guaiacin or guaiacin-like compound, or biologically acceptable salt thereof in an amount of from about 0.01 mg to about 2000 mg per kg of animal feed.

BRIEF DESCRIPTION OF THE DRAWINGS

Those of skill in the art will understand that the drawings, described below, are for illustrative purposes only. The drawings are not intended to limit the scope of the present teachings in any way.

(26.295), 10 (26.810), 11 (35.346), 12 (35.888), 13 (37.983), 14 (39.385), 16 (41.869), 19 (45.074), 21 (48.215) and 25 (54.615): Furoguaiacin-like; Peaks 5 (18.816), 7 (20.551), 18 (44.530), 20 (46.662), 23 (50.702), 24 (53.528) and 29 (67.062): Guaiacin-like; Peaks 15 (41.336), 22 (49.639), 26 (57.693), 27 (61.201), 28 (64.556) and 30 (68.034): Unknown compounds.

Figure 11:
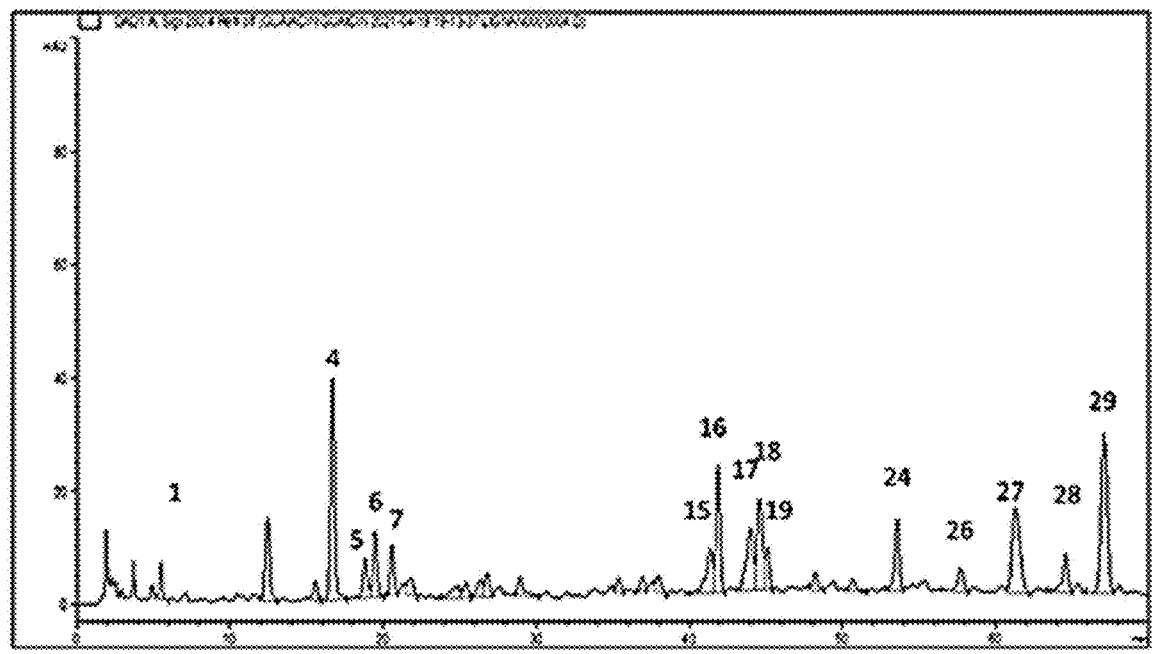

FIG. 11 shows the HPLC chromatogram of a branch of a mature tree (Tree stem diameter: 40 cm, branch diameter: 2.54 cm). The numbers above the peaks are associated with the compounds as explained. Retention time for peaks in minutes shown in parentheses. Peaks 1 (5.513), 3 (15.597), 6 (19.493) and 8 25.332): Vanillin-like; Peaks 2 (12.476) and 17 (43.981): Guaiaretic acid-like; Peaks 4 (16.112), 9 (26.340), 10 (26.872), 11 (33.806), 12 (35.386), 13 (36.421), 14 (37.887), 16 (41.887), 19 (43.861), 21 (48.223) and 25 (54.511): Furoguaiacin-like; Peaks 5 (18.840), 7 (20.581), 18 (44.586), 20 (45.090), 23 (50.674), 24 (53.558) and 29 (67.079): Guaiacin-like; Peaks 15 (41.372), 22 (49.445), 26 (57.715), 27 (61.268), 28 (64.576) and 30 (68.015): unknown compounds.

Figure 12:
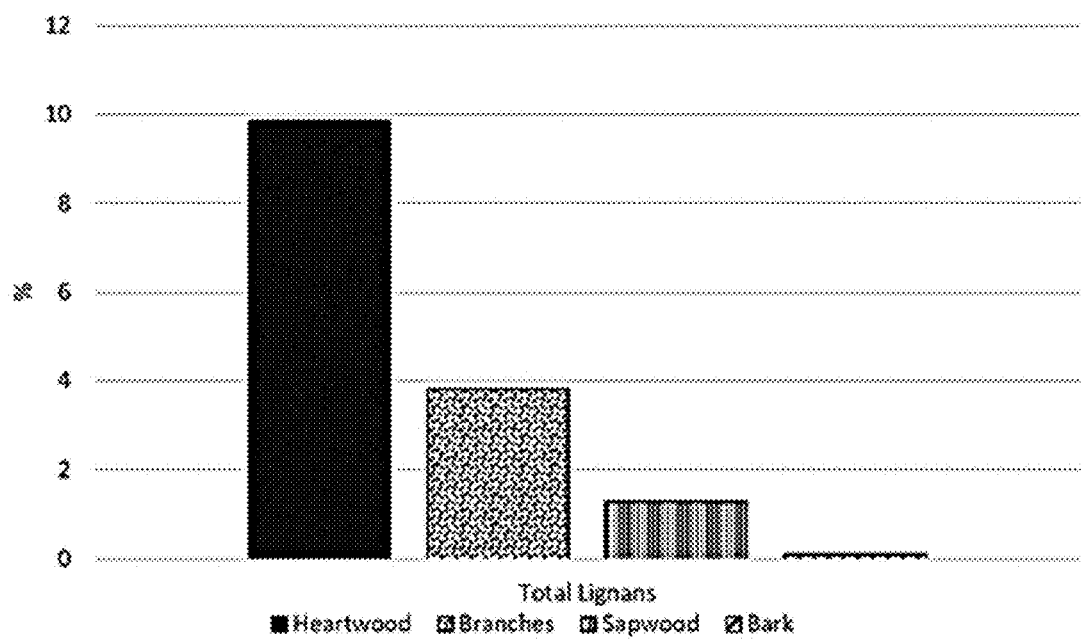

FIG. 12 shows the total lignans content, expressed in %, of different botanical parts of *Guaiacum sanctum*.

Figure 13:
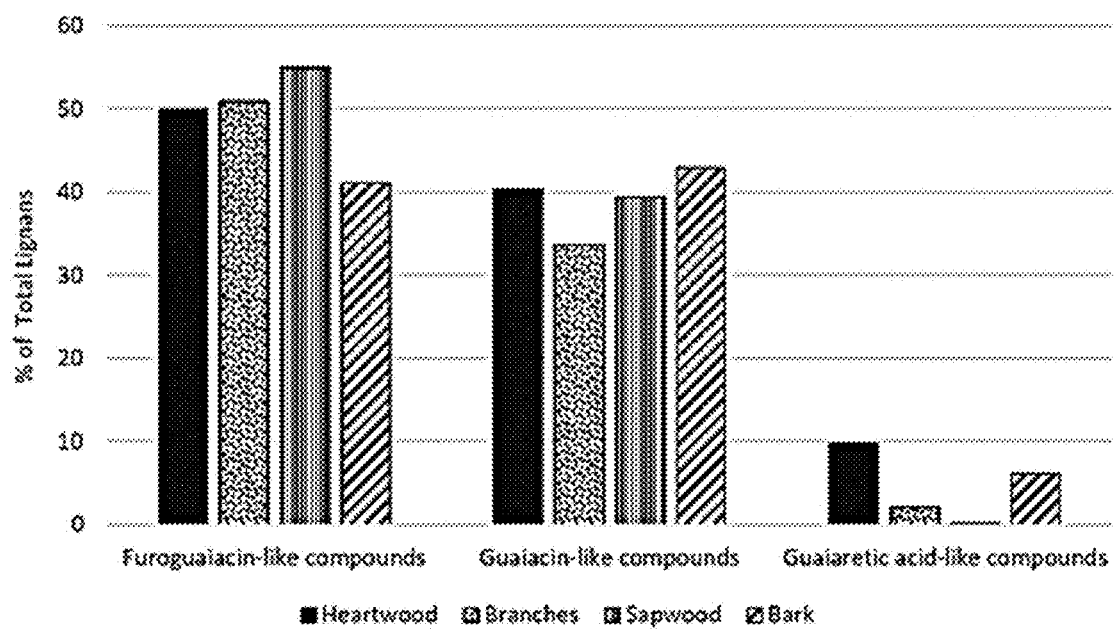

FIG. 13 shows the content in Furoguaiacin-like, Guaiacin-like and Guaiaretic acid-like in heartwood, branches, sapwood and bark of *Guaiacum sanctum*. The content is expressed in % of total lignans.

Figure 14:
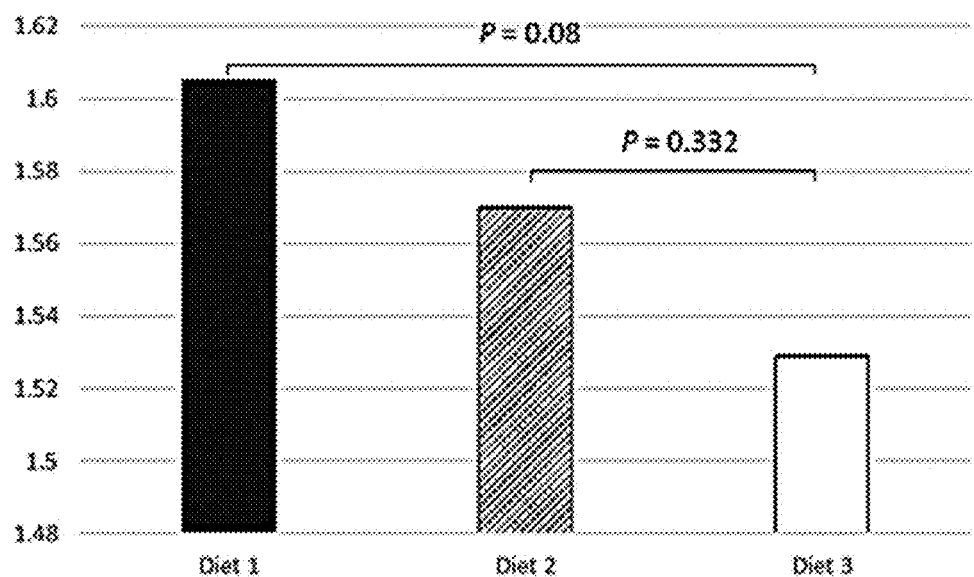

FIG. 14 illustrates that the dietary inclusion of 8 ppm of Total Lignans standardized in Furoguaiacin-like compounds and Guaiacin-like compounds (Diet 3-50% Furoguaiacin-like compounds and 40% Guaiacin-like compounds) improve feed conversation in chickens compared to a negative control and a positive control. The negative control is the diet with no feed additive (Diet 1). The positive control is the same diet with inclusion of a technology considered as a standard for alternative to antibiotic growth promoters (Diet 2-100 ppm of XTRACT® Evolution-B, Code X60-6930). Values shown in the figure are averages. In the figure, different letters on the bars indicate significant differences.

Figure 15:
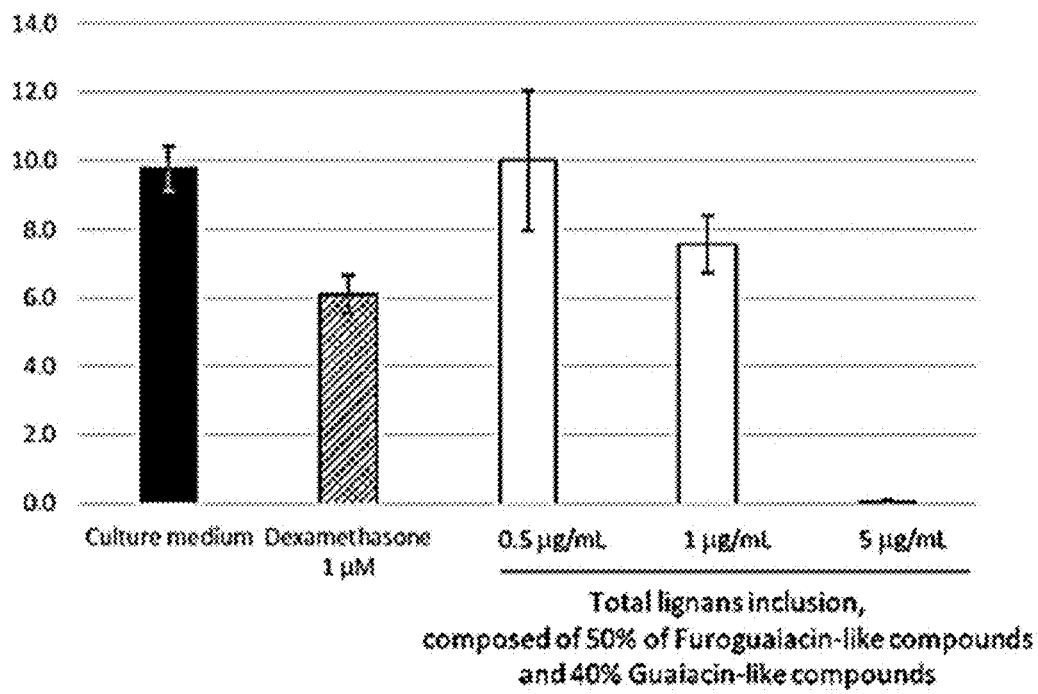

FIG. 15 shows the effect on standard doses of Total Lignans standardized in Furoguaiacin-like compounds and Guaiacin-like compounds on the production of an inflammatory cytokine, TNFα. The negative control is shown by the culture medium. The positive control is the inclusion of 1 μM of dexamethasone. Values shown in the figure are averages. The bars also show the standard deviation.

Figure 16:
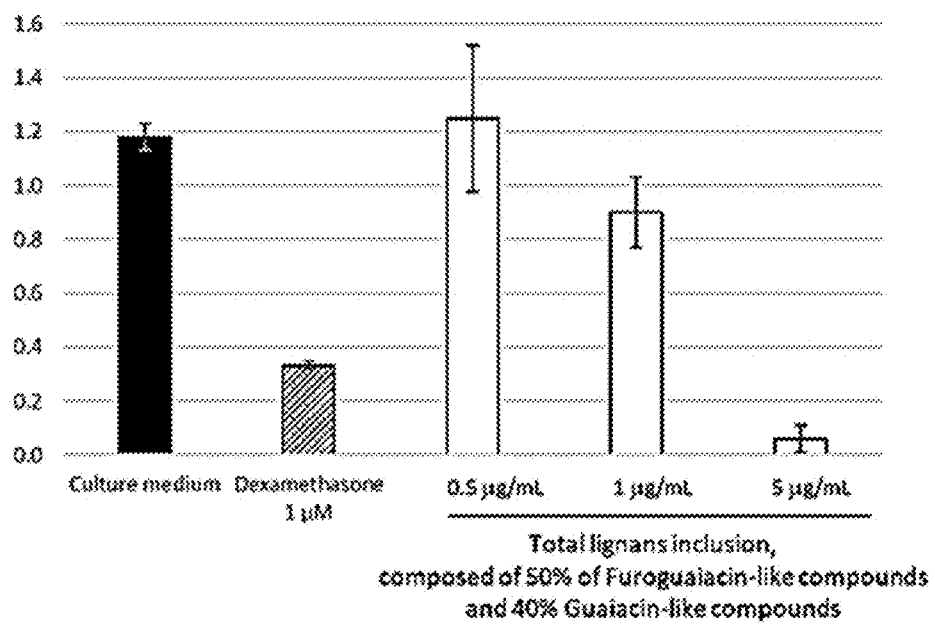

FIG. 16 shows the effect on standard doses of Total Lignans standardized in Furoguaiacin-like compounds and Guaiacin-like compounds on the production of an inflammatory cytokine, IL6. The negative control is shown by the culture medium. The positive control is the inclusion of 1 μM of dexamethasone. Values shown in the figure are averages. The bars also show the standard deviation.

Figure 17:
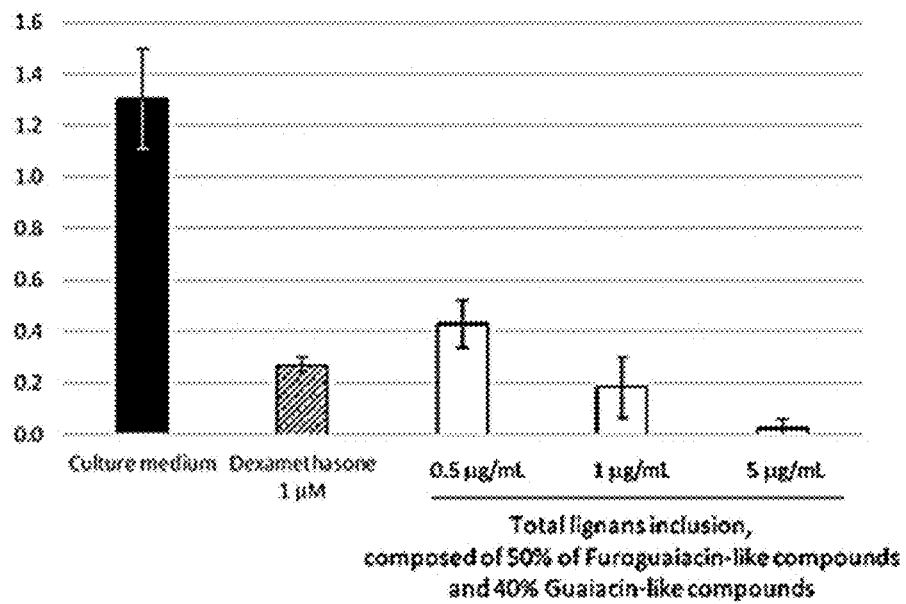

FIG. 17 shows the effect on standard doses of Total Lignans standardized in Furoguaiacin-like compounds and Guaiacin-like compounds on the production of an inflammatory cytokine, IL1β. The negative control is showed by the culture medium. The positive control is the inclusion of 1 uM of dexamethasone. Values shown in the figure are averages. The bars also show the standard deviation.

Figure 18:
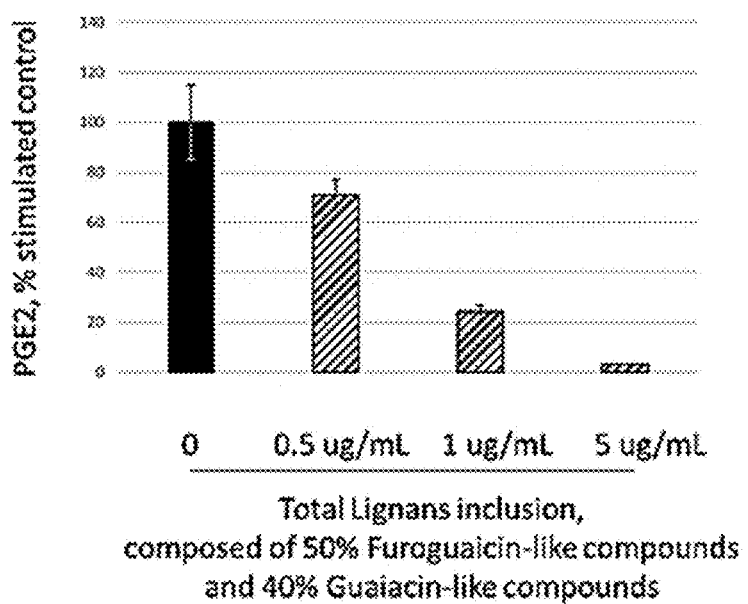

FIG. 18 illustrates that standard doses of Total Lignans standardized in Furoguaiacin-like compounds and Guaiacin-like compounds on PGE2 production in chondrocytes in a cell-based bioassay in vitro. The black bar and hatched bars are the control, and the experimental treatments, respectively. Standard deviations are shown in the bars.

Figure 19:
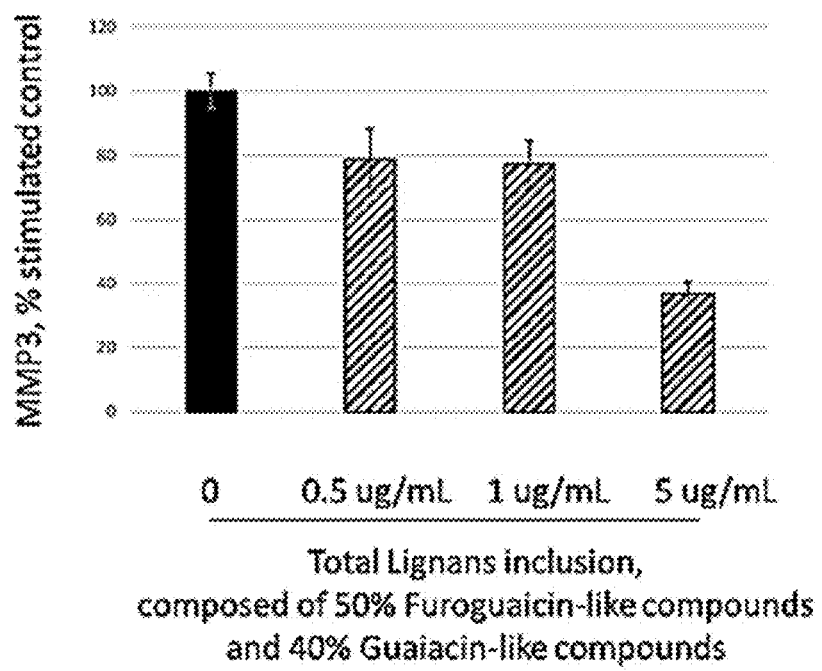

FIG. 19 illustrates that standard doses of Total Lignans standardized in Furoguaiacin-like compounds and Guaiacin-like compounds on matrix metalloproteinase-3 in chondrocytes in a cell-based bioassay in vitro. The black bar and hatched bars are the control, and the experimental treatments, respectively. Standard deviations are shown in the bars.

Figure 20:
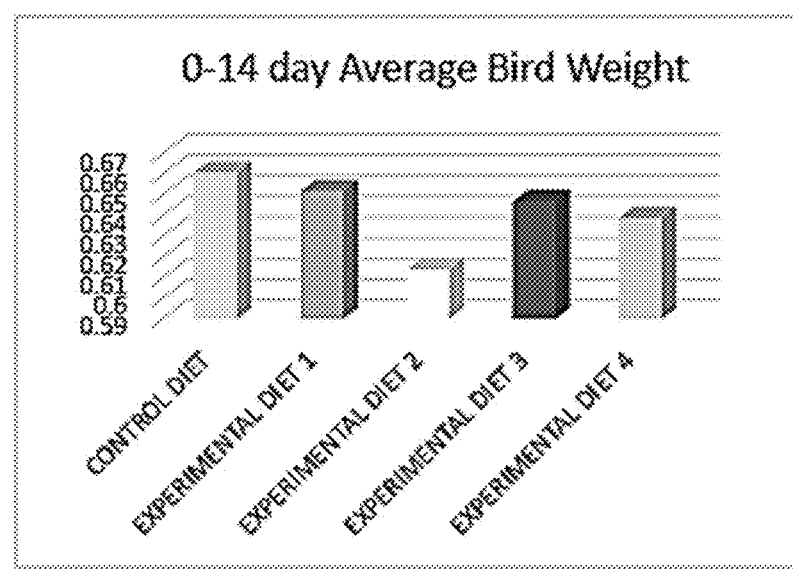

FIG. 20 shows the results of 0-14 day average bird weight.

Figure 21:
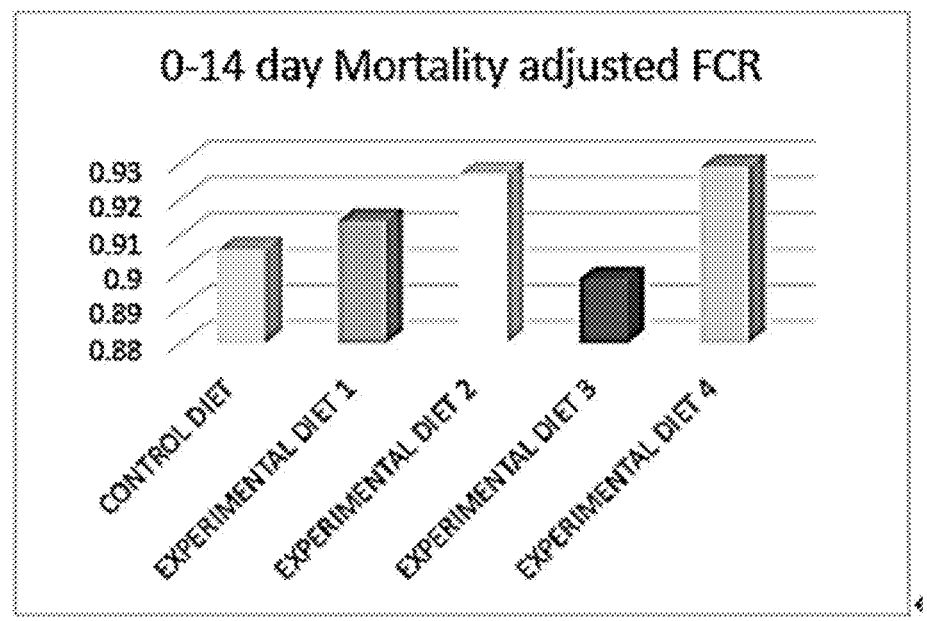

FIG. 21 shows the results of 0-14 day mortality adjusted FCR.

Figure 22:
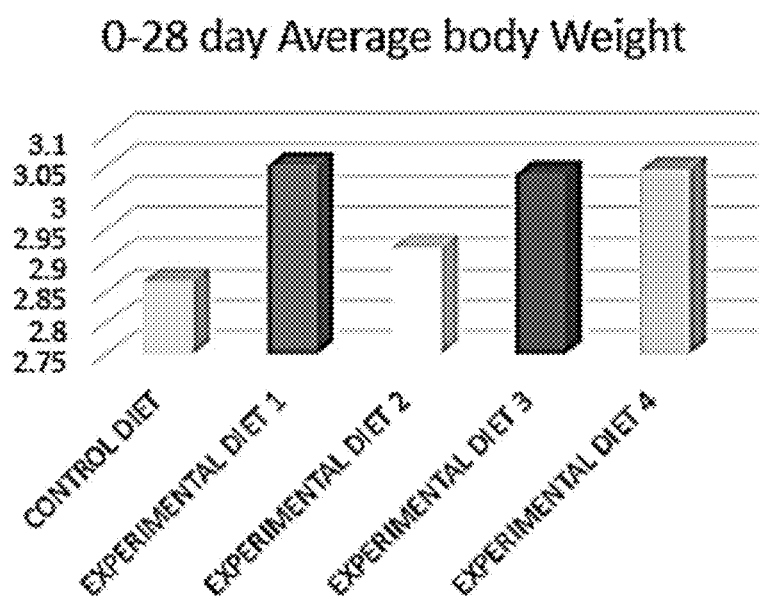

FIG. 22 shows the results of 0-28 day average body weight.

Figure 23:
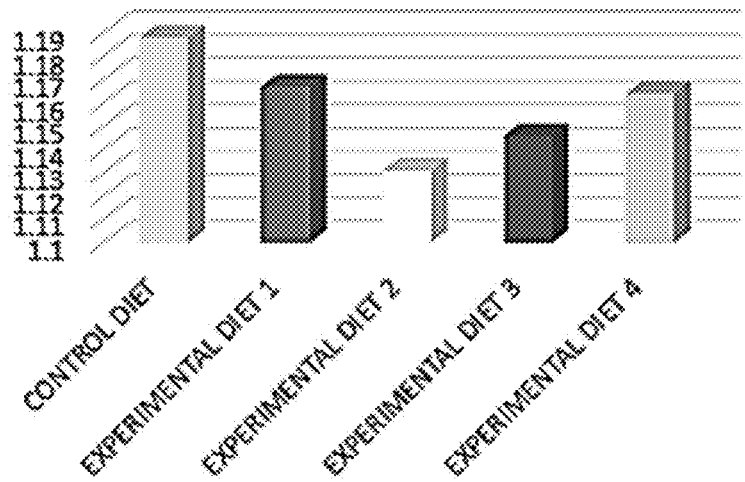

FIG. 23 shows the results of 0-28 day mortality adjusted FCR.

Figure 24:
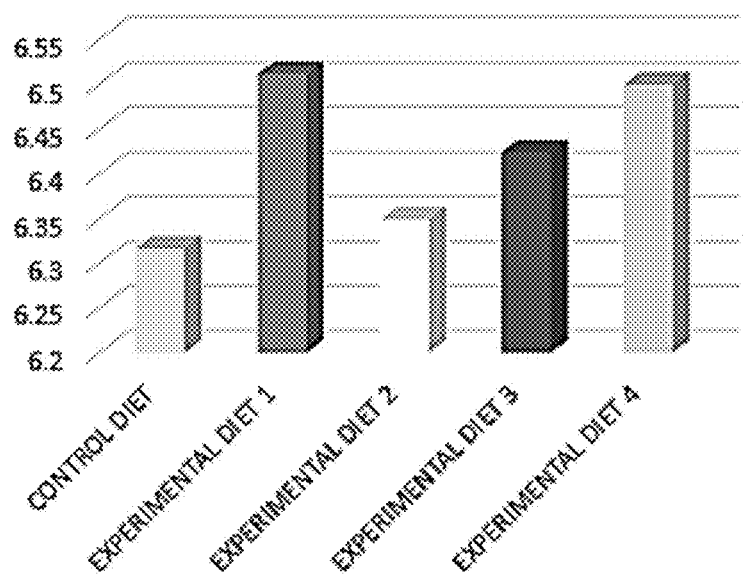

FIG. 24 shows the results of 0-42 day average body weight.

Figure 25:
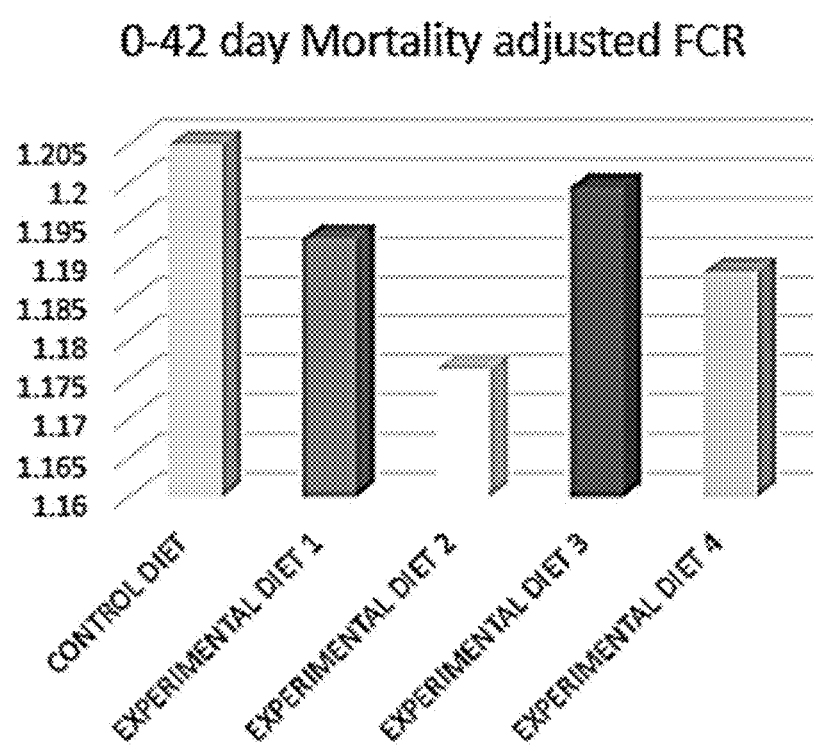

FIG. 25 shows the results of 0-42 day mortality adjusted FCR.

DETAILED DESCRIPTION

The present disclosure provides a feed additive for domesticated animals that is capable of increasing feed performance, as well as associated methods for promoting growth and zootechnical performance in domesticated animals. The animal feed additive provided herein contains marrubiin and in certain embodiments Total Lignans standardized in the contents of Furoguaiacin-like compounds and Guaiacin-like compounds. The present disclosure also describes methods for improving growth via the dietary inclusion of marrubiin and in some embodiments Total Lignans standardized in Furoguaiacin-like compounds and Guaiacin-like compounds.

Farm animals are exposed to various stressors, especially in current production contexts, where antibiotics, drugs and chemicals are progressively banned from the diet fed to these animals. For example, chickens are exposed to a chronic gut inflammation (REF). It is now accepted that the use of antibiotics and other drugs was a crutch which decreased the reaction of the animal to this variety of stresses. A new way of looking at improving performance of farm animals is by mitigating the impact of a variety of stressors to which they are exposed. This holistic approach to improving performance does not only consider direct improvement of daily gain or feed conversion or milk yield for example, but an improvement of a multitude of responses that, collectively, improve the status of the animal, its welfare and eventually, its production. It is in this context that the present invention proposes a new way to improve animal productivity in a natural way and while preserving animal welfare. Dietary addition of marrubiin, or the plant *Marrubium vulgare*, has the capacity of improving several physiological issues to which the farm animals are exposed. The invention is detailed in the examples below.

The chemical structure of marrubiin ($C_{20}H_{28}O_4$; structure 1) is shown below.

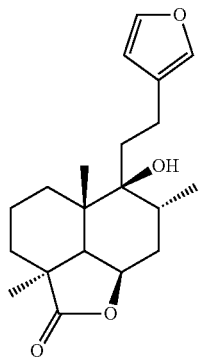

1

Active compounds related to marrubiin include, but are not limited to, marrubiinic acid (structure 2) and marrubenol (structure 3).

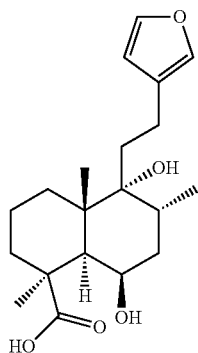

2

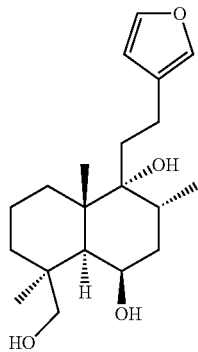

3

Marrubiin is a widely known diterpenoid lactone that constitutes the bitter principle of the horehound and many other medicinal plants of the family Lamiaceae. It is one of the main constituents of *Marrubium vulgare*, *Leonotis leonurus* and *Leonotis nepetifolia*. It is a major constituent of many species of the genus *Marrubium* (Lamiaceae) and includes about 97 species found along the Mediterranean and temperate regions of the Eurasian zone. Marrubiin is also found in plants including, but not limited to, *Marrubium velatinum*, *Marrubium cylleneum*, *Marrubium trachyticum*, *Marrubium globosum*, *Marrubium anisodon*, *Marrubium sericeum*, *Marrubium supinum*, *Phlomis bracteosa*, *Marrubium deserti de Noe*, *Marrubium alysson* and *Marrubium thessalum*.

Phenolic compounds are a class of plant secondary metabolites with important roles in plant physiology. The structure of phenolic compounds varies extensively and according to their structures, they are classified in 4 categories: phenolic acids, flavonoids, stilbenoids, and lignans. Lignans are widely distributed throughout plants such as in cereals, grains, berries and garlic. Total Lignans refers to the sum of the lignans in a plant composition.

The instant disclosure provides a novel approach using total lignans, standardized using two specific lignan constituents, Furoguaiacin-like compounds and Guaiacin-like compounds, for improving performance (increased intake, daily gains and/or improved efficiency) in farm or other domesticated animals. These compounds may be used during normal rearing conditions.

The word lignan encompasses a variety of chemical structures. Pilkington classified lignans in two main categories: classical lignans and neolignans, and two smaller categories: flavonolignans and coumarolignans (Lignans: A Chemometric Analysis. Molecules 23:1666, 2018). Each of these categories are organized in several subcategiories. There are 6 main subcategories of classical lignans: CL1: dibenzylbutanes, CL2: dibenzylbutyrolactones, CL3: arylnaphthalenes/aryltetralins, CL4: dibenzocyclooctadienes, CL5: substituted tetrahydrofurans, and CL6: 2,6-diarylfurofurans. There are 15 subcategories of neolignans, with the most common subcategories being: NL1: benzofurans, NL2: 1,4-benzodioxanes, NL3: alkyl aryl ethers, NL4: biphenyls, NL5: cyclobutanes, NL6: 8-10-bicyclo[3.2.1]octanes, NL7: 8-30-bicyclo[3.2.1]octanes and NL8: biphenyl ethers.

The chemical structure of a natural molecule correlates with its function. Molecules with different chemical structures show different biological or physiological functions between categories and even subcategories. Lignans from different lignan categories and subcategories will show different physiological functions and impact, and hence, different productive performance on the target animal. In other words, the physiological function, and hence, productive performance response of an animal, of a lignan correlates with its chemical structure.

Furoguaiacin (aka alpha-Guaiaconic acid, structure 4) is a classical lignan belonging to the substituted tetrahydrofuran subcategory (see CL5 subcategory above) with the molecular formula $C_{20}H_{20}O_5$.

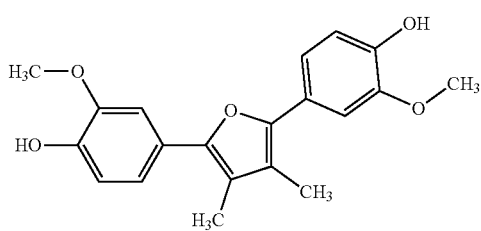

4

Guaiacin (structure 5) is a classical lignan belonging to the arylnaphthalene/aryltetraline subcategory of lignan (see CL3 subcategory above) with the molecular formula $C_{20}H_{24}O_4$.

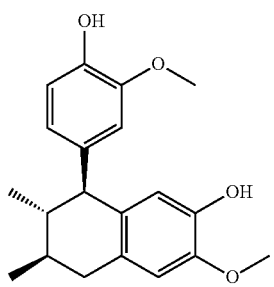

*Guaiacum sanctum* or *Guaiacum officinale* are one source for Guaiacin or guaiacin-like compounds. *Guaiacum* gum or guaiac resin can be extracted from the heartwood of *Guaiacum officinale* and *Guaiacum sanctum*. Furoguaiacin or furoguaiacin-like compounds and Guaiacin or guaiacin-like compounds are mainly found in *Guaiacum* trees or their extracts, although other sources of furoguaiacin or furoguaiacin-like compounds and guaiacin or guaiacin-like compounds include, but are not limited to, *Machilus edulis, Persea fructifera, Machilus thunberghii, Cinnamomum philippense, Saurus cernuus*, and *Myristica fragrans*.

Furoguaiacin-Like and Guaiacin-Like Compounds

Furoguaiacin-like and guaiacin-like compounds in certain embodiments can be defined herein by the core structure shown below (structure 6):

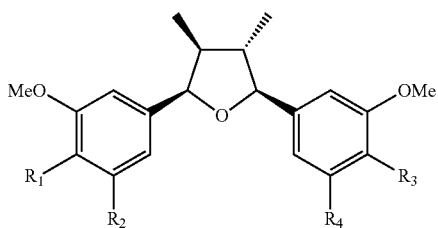

In certain embodiments, the R1, R2, R3 and R4 groups are as shown in Table 1, below.

TABLE 1

| $R_1$ | $R_2$ | $R_3$ | $R_4$ |
|---|---|---|---|
| OH | $OCH_3$ | $OCH_2$ | O |
| $OCH_3$ | $OCH_3$ | $OCH_2$ | O |
| $OCH_3$ | $OCH_3$ | OH | $OCH_3$ |
| $OCH_2$ | O | $OCH_2$ | O |

In additional embodiments the furoguaiacin-like compounds and guaiacin-like compounds include the corresponding glycosidic forms.

Animal Feed Components

Provided herein are novel animal feed compositions with improved performance as a result of comprising the animal feed ingredient composition described herein. Different domesticated animals have different feed requirements. For example, the main ingredients in chicken feed are generally cereals, including, but not limited to, wheat, corn, sorghum, oats, barley or rye, protein, which can come from oilseed meals, and fat or oil. However, other ingredients can be added to chicken feed, including, but not limited to, a source of calcium, salts, minerals, probiotics, vitamins, amino acids, flavorings and preservatives. An exemplary chicken feed for chicks and pullets includes protein, lysine, methionine, fat, fiber, calcium, phosphorous, NaCl, manganese, vitamin A and vitamin E.

The main ingredients in pig feed are generally cereals, including, but not limited to, rice bran, broken rice, and corn, protein, which can come from oilseed meals such as alfalfa meal, or soybean meal, minerals and vitamins. However, other ingredients can be added to pig feed, including, but not limited to, a source of calcium, salts, minerals, probiotics, vitamins, amino acids, flavorings and preservatives. An exemplary pig feed includes an energy source (cereals), protein, vitamins, minerals, fiber, prebiotics and botanicals.

The main ingredients in dairy cattle feed are generally cereals, protein, which can come from oilseed meal such as cottonseed meal or soybean meal, sugar and fat. However, other ingredients can be added to dairy cattle feed, including, but not limited to, fiber, a source of calcium, salts, minerals, probiotics, vitamins, amino acids, flavorings and preservatives.

The main ingredients in beef cattle feed are generally cereals, including, but not limited to, wheat, corn, sorghum, oats, barley or rice, and protein, which can come from de-oiled rice bran, rice polish, wheat bran or corn bran. However, other ingredients can be added to beef cattle feed, including, but not limited to, fiber, fat, salts, minerals, probiotics, vitamins, amino acids, flavorings and preservatives.

The main ingredients in sheep feed are generally cereals, such as alfalfa and corn, vitamins, such as vitamin A, vitamin D and vitamin E, selenium, mineral salts and phosphorous. However, other ingredients can be added to sheep feed, including, but not limited to, fat, probiotics, amino acids, flavorings and preservatives. An exemplary sheep feed for mature ewes and rams includes cereals, protein, fat, fiber, calcium, ammonium chloride, phosphorous, NaCl, selenium and vitamin A.

The main ingredients in goat feed are generally cereals, such as hay, alfalfa, barley corn and oats, protein, which can come from distilled grains and meals, fat, fiber and minerals such as calcium, phosphorous, NaCl, copper, selenium, and vitamins such as vitamin A, vitamin D and vitamin E. However, other ingredients can be added to goat feed, including, but not limited to, probiotics, amino acids, flavorings and preservatives. An exemplary goat feed includes grain products, protein, fat, fiber, acid detergent fiber and calcium, phosphorous, NaCl, as well as copper, selenium, and vitamins such as vitamin A, vitamin D and vitamin E.

As described herein, the performance of any such animal feeds may be improved by the addition of the animal feed ingredient provided by the present disclosure. The amount added may be optimized depending upon the type of feed, animal physiology, conditions under which the animal being fed is raised, and other conditions as will be understood to those of skill in the art according to the teachings of the present disclosure.

EXAMPLES

Example 1

This example evaluated the effect of increasing dose of *Marrubium vulgare* extract on anti-inflammatory cytokines in vitro. *Marrubium vulgare* plant extract (called *Marrubium vulgare* extract) was prepared as follows. *Marrubium vulgare* plant was ground in a centrifugal mill before extraction. Approximately 100 g of the ground *Marrubium vulgare* was extracted with 1000 g of solvent at 40° C. for 60 min under stirring. The crude extract was then filtered under vacuum and the filtrate was concentrated in a rotary evaporator under reduced pressure at 40° C. to a concentrated fluid extract with dry matter contents of 10 to 35%.

The anti-inflammatory effect, i.e., the inhibitory effect on cytokine release of a 70% v/v ethanolic *Marrubium vulgare* extract, standardized in marrubiin was determined using the THP-1 human monocytic cell line, which were differentiated into macrophage-like cells by phorbol myristate acetate. Prior to the assay the potential cytotoxic effect of the test compound was determined using the 3-(4,5-dimethylthiazol-2-yl)-2,5-diphenyltetrazolium bromide assay for determining mitochondrial dehydrogenase activities in the living cells. The anti-inflammatory effect on cytokine release in the THP-1 macrophage cells was measured by incubating the cells with three concentrations of the *Marrubium vulgare* extract followed by the addition of LPS to stimulate the cytokine production. After 24 h the amount of TNF-α, IL-1β and IL-6 was determined in the supernatant of the cell cultures by capture ELISA using commercial kits.

Figure 1:
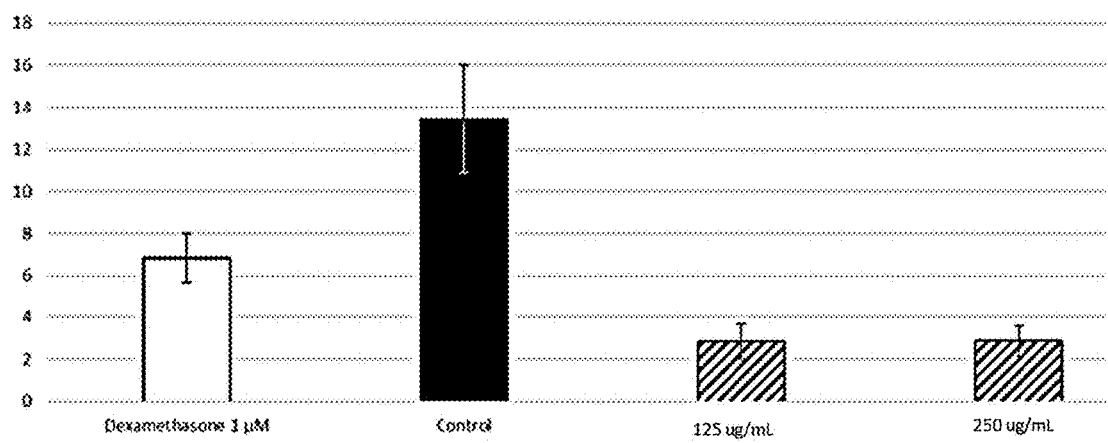
FIG. 1 illustrates that 0.125 mg/mL and 0.25 mg/mL of *Marrubium vulgare* extract reduced the release of the proinflammatory cytokine TNFα in human macrophage-like cells in vitro, measured as pg of TNFα per µg of protein. The control treatment (black bar) is the medium. The positive control (white bar) is the medium with inclusion of 1 µM of dexamethasone. Values shown in the figure are averages. The bars show the standard deviation.
Figure 2:
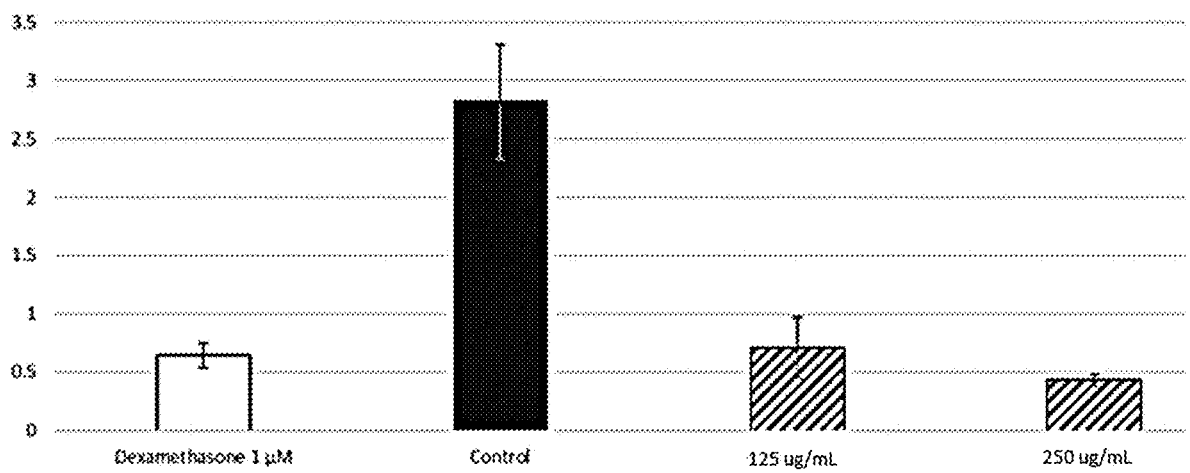
FIG. 2 illustrates that 0.125 mg/mL and 0.25 mg/mL of *Marrubium vulgare* extract reduced the release of the proinflammatory cytokine IL6 in human macrophage-like cells in vitro, measured as pg of IL6 per µg of protein. The control treatment (black bar) is the medium. The positive control (white bar) is the medium with inclusion of 1 µM of dexamethasone. Values shown in the figure are averages. The bars show the standard deviation.
Figure 3:
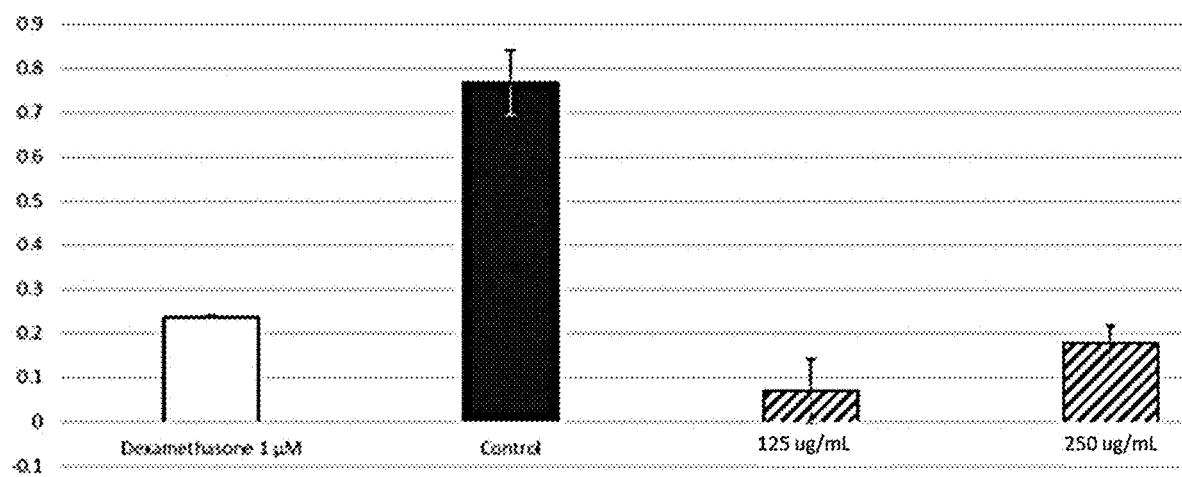
FIG. 3 illustrates that 0.125 mg/mL and 0.25 mg/mL of *Marrubium vulgare* extract reduced the release of the proinflammatory cytokine IL1β in human macrophage-like cells in vitro, measured as pg of IL1β per µg of protein. The control treatment (black bar) is the medium. The positive control (white bar) is the medium with inclusion of 1 µM of dexamethasone. Values shown in the figure are averages. The bars show the standard deviation.

The main results are summarized. Two doses of *Marrubium vulgare* extract (0.125 mg/mL and 0.25 mg/mL) reduced the production of the inflammatory cytokine TNFα (FIG. 1), the production of the inflammatory cytokine IL6 (FIG. 2) and the production of the inflammatory cytokine IL1β (FIG. 3).

Example 2

This example evaluated the effect of one dose of *Marrubium vulgare* extract on the physiology of the muscle cell.

Bioassays were performed with a mouse myoblast cell line called C2C12. *Marrubium vulgare* extract was tested at 25 and 30 µg/ml in triplicates. Two outcomes were measured. First, the muscle cell proliferation assay was used to investigate the influence of *Marrubium vulgare* extract (25 µg/ml) on muscle cell proliferation and growth. The determination of the protein content was used as a mean to identify cell proliferation in the applied in vitro model. The first supplementation of the C2C12 mouse myoblast cell line with *Marrubium vulgare* extract was performed 24 hours after seeding. After five days, differentiation of the cells was initiated. The second supplementation with *Marrubium vulgare* extract was performed 24 hours after the beginning of the differentiation. At day 3 of the differentiation phase, the last supplementation with *Marrubium vulgare* extract was performed. Cells were lysed 7 days after the beginning of the differentiation and the protein content was determined using a Bradford assay. A medium control was performed with each batch. Assay was carried out in triplicates. Second, the glucose uptake assay was used to investigate the influence of *Marrubium vulgare* extract (30 µg/ml) on glucose uptake in muscle cells. C2C12 cells were seeded and grown to confluence (3 days). Cells were differentiated for 4 days to form myotubes and were then treated with *Marrubium vulgare* extract for 24 hours. After supplementation, glucose was depleted for 24 hours followed by serum depletion overnight. After washing, a fluorescent glucose analog for monitoring glucose uptake into living cells called 2-NBDG (2-(N-(7-Nitrobenz-2-oxa-1,3-diazol4-yl)-Amino)-2-Deoxyglucose) was added to the medium. After 30 minutes fluorescence was measured after washing and lysing the cells. The assay was carried out in n=6.

Figure 4:
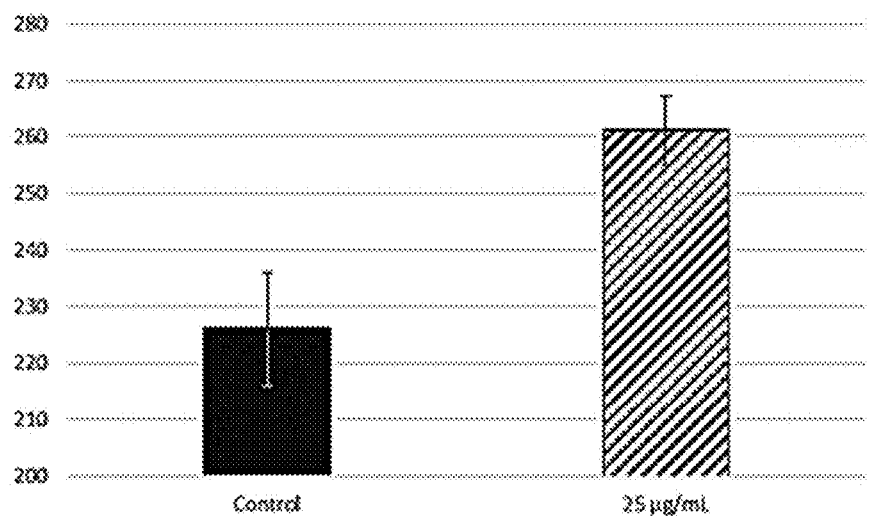
FIG. 4 shows that the inclusion of 25 µg/mL of *Marrubium vulgare* extract stimulated protein formation and muscle cell proliferation in C2C12 cells in vitro. The Y axis (expressed in µg/ml) shows the protein content used as an estimate of muscle cell proliferation. The dark bar is the control without addition of plant extract; the hatched bar is the *Marrubium vulgare* treatment. Standard deviations are shown on the bars.
Figure 5:
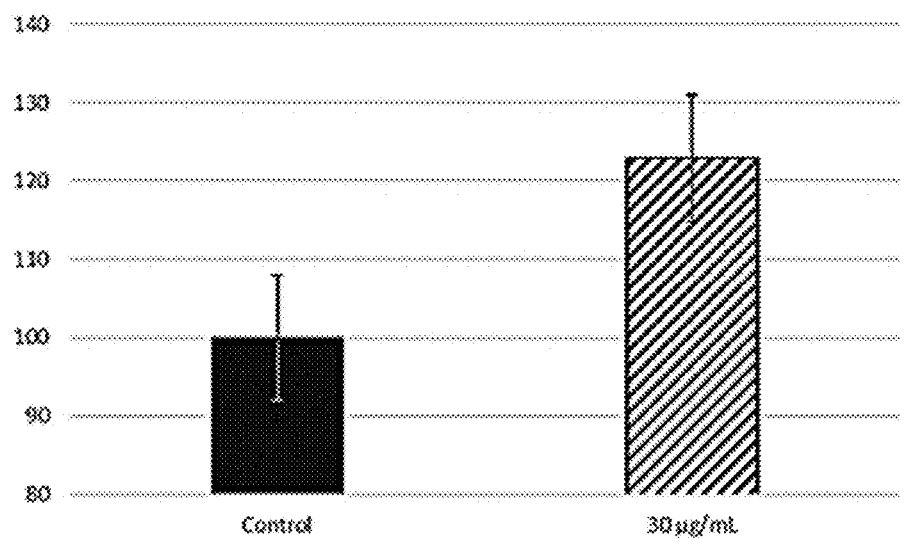
FIG. 5 shows that the addition of 300 µg/mL of *Marrubium vulgare* extract increases glucose uptake by the C2C12 muscle cell in vitro. They axis is the response of the plant treatment (hatched bar) compared to the control (set for 100%; black bar). Standard deviations are shown on the bars.

The results indicated that *Marrubium vulgare* extract increased muscle cell proliferation at 25 µg/ml (FIG. 4) and glucose uptake at 30 µg/ml (FIG. 5).

Example 3

This example demonstrated the ability of *Marrubium vulgare* extract to support the liver detoxification function after aflatoxin B1 intoxication. Aflatoxin B1 was used as a model of liver intoxication.

*Marrubium vulgare* extract was involved in a hepatoprotection assay. The human hepatocellular carcinoma cell line HepG2 has been widely recognized as a model system to evaluate toxic effects of various substances, since these cells express most of the metabolic enzymes found in liver cells that can catalyze biotransformation reactions. Therefore, this cell line is suitable for testing compounds with regard to their potential hepatoprotective effects.

HepG2 cells were seeded in 96-well format at a density of $1.6 \times 10^4$ cells/0.2 mL in 90% Dulbecco's Modified Eagle Medium (DMEM) medium with 10% heat inactivated fetal bovine serum (FBS) for 24 hours. Then, the cells were supplemented with 3 doses (125, 250 and 500 µg/mL) of *Marrubium vulgare* extract and 1.5 µM of Aflatoxin B1. Viability was determined after 48 hours using a Resazurin assay. The assay was performed in triplicates with the 3 concentrations of *Marrubium vulgare* extract. A control without Aflatoxin B1 and without *Marrubium vulgare* extract was performed.

Figure 6:
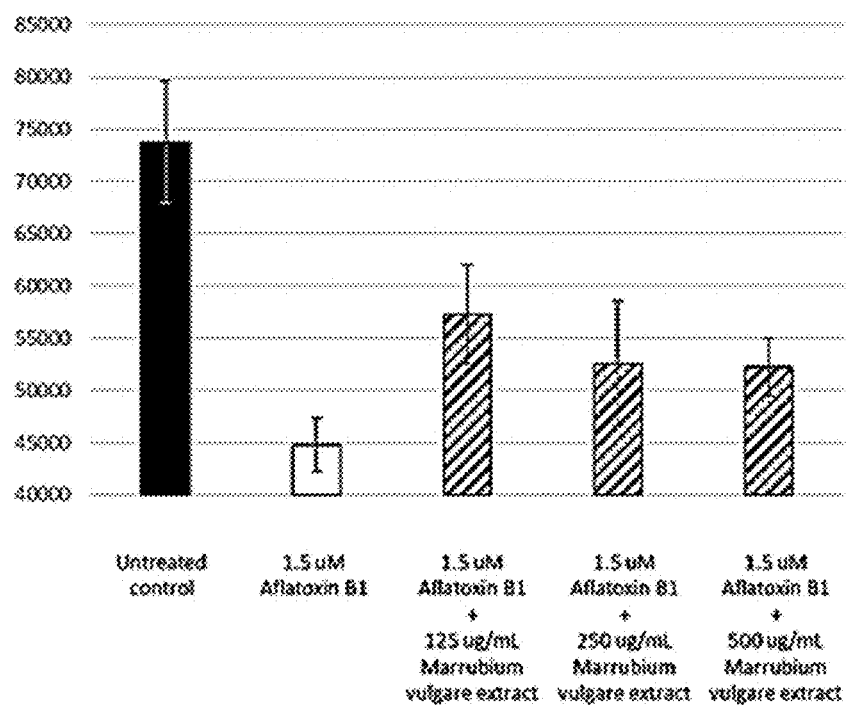
FIG. 6 illustrates that *Marrubium vulgare* extract partially reverted the toxicity of 1 µM of aflatoxin B1 in HepG2 cells in an in vitro bioassay. The black bar is the untreated control; the white bar is the treatment consisting in 1 µM of aflatoxin B1; the hatched bars show treatments with 1 µM of aflatoxin B1 supplemented by increasing inclusions of *Marrubium vulgare* extract.

The results showed that even the lowest dose of *Marrubium vulgare* extract mitigated the toxicity of Aflatoxin B1 (FIG. 6). This suggests that *Marrubium vulgare* could be used as a liver supporting compound, eventually leading to improved status and performance of farm animals.

Example 4

In this example, the effect of *Marrubium vulgare* extract on markers of osteoarthritis was evaluated in an in vitro cell-based assay.

Chondrocytes were seeded in 96-well plates and cultured for 24 hours in culture medium. The culture medium was composed of Dulbecco's modified Eagle's medium supplemented with 4 mM L-glutamine, 50 U/mL Penicillin and 50 µg/mL Streptomycin, 10% fetal calf serum. The medium was then removed and replaced by assay medium containing or not (control) the test compounds or the references (dexamethasone at 0.1 µM for MMP-3 and indomethacin at 1 µM for PGE2) and the cells were pre-incubated for 24 hours. The assay medium was composed of Dulbecco's modified Eagle's medium supplemented with 4 mM L-glutamine, 50 U/mL Penicillin and 50 µg/mL Streptomycin, 2% fetal calf serum. After the pre-incubation, the medium was removed and replaced by assay medium containing or not (control) the test compounds or the references in presence of the mix of cytokines (IL-1β+TNF-α+IFN-γ+IL-6 at 3 ng/ml each) and the cells were incubated for 48 hours. A non-stimulated control was performed in parallel. All experimental conditions were performed in n=3.

At the end of incubation, the supernatants were collected for the quantification of the release of an inflammatory marker Prostaglandin E2 (PGE2) as well as the level of a matrix-degrading enzyme (MMP-3, a metalloprotease involved in cartilage degradation) were determined using specific ELISA kits according to the supplier's instructions.

The assay kits were Enzo Life Sciences, Ref. ADI-901-001 (for PGE2) and Supplier: R&D Systems, Ref. DY513 (for MMP-3).

Figure 7:
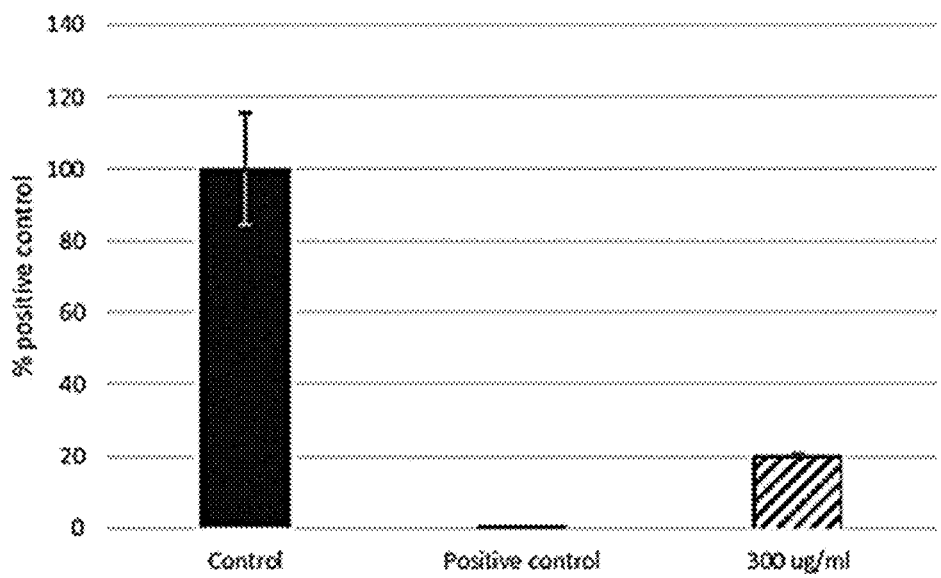
FIG. 7 illustrates that 300 µg/mL of *Marrubium vulgare* extract decreased PGE2 production in chondrocytes in a cell-based bioassay in vitro. The back bar, white bar and hatched bar are the control, positive control and the *Marrubium vulgare* extract treatment, respectively. Standard deviations are shown in the bars.
Figure 8:
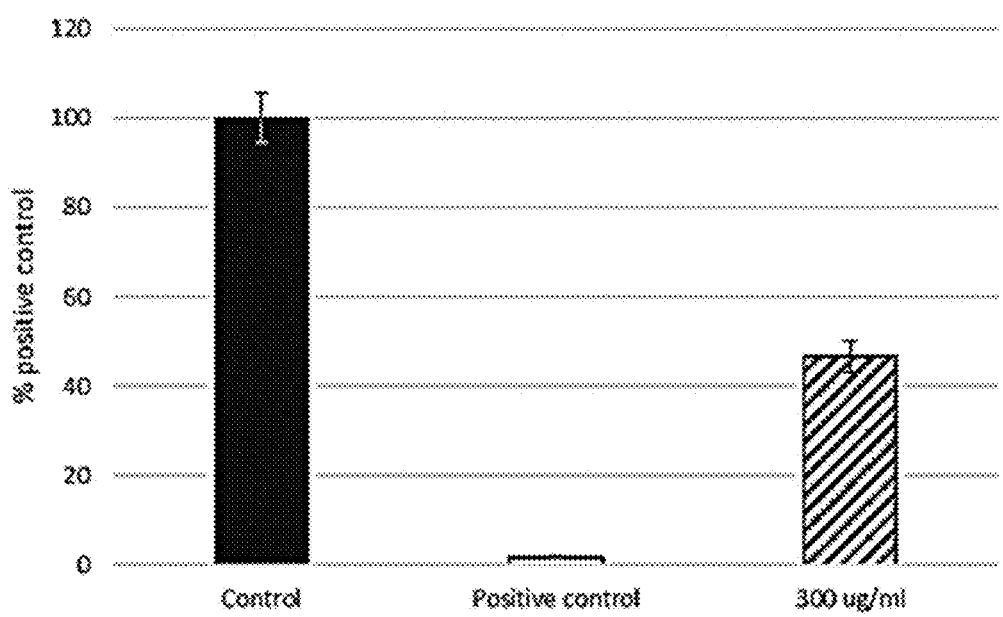
FIG. 8 illustrates that 300 µg/mL of *Marrubium vulgare* extract decreased matrix metalloproteinase-3 in chondrocytes in a cell-based bioassay in vitro. The back bar, white bar and hatched bar are the control, positive control and the *Marrubium vulgare* extract treatment, respectively. Standard deviations are shown in the bars.

The results were the following. 300 μg/mL of *Marrubium vulgare* extract decreased PGE2 production (FIG. 7), and 300 μg/mL of *Marrubium vulgare* extract reduced matrix metalloproteinase-3 (FIG. 8).

Example 5

This example illustrates the positive effect of dietary inclusion of *Marrubium vulgare* aerial parts on performance of farm animals.

The study evaluated the effect of one dose of *Marrubium vulgare* when fed to broiler chickens from 1 to 14 days of age on growth performance, feed intake and feed efficiency (measured by feed conversion ratio). Treatments included two control diets and one experimental diet.

The basal diet composition was the following (expressed in kg/100 kg): corn 35.00, Oats 14.00, Barley 7.00, vegetable oil 6.00, corn gluten meal 1.00, Soybean mean 29.00, rapeseed mean 3.00, monocalcium phosphate 1.80, limestone 0.40, NaCl 0.40, Lysine 0.50, Methionine 0.60 and a premixture containing other minerals and vitamins 0.500. The nutritional composition of Diet 1 was 12.878 MJ/kg, crude protein 22.094%, crude fat 8.681%, fiber 4.203%, Lysine 1.559%, Methionine 0.7907.

The treatments were obtained by supplementing the basal diet with a compound. Diet 1 acted as a negative control and did not include any compound. Diet 2 acted as a positive control diet; it included 100 g per metric ton of XTRACT® Evolution-B, Code X60-6930, a product accepted as an alternative to antibiotic growth promoter (EFSA Journal, 2015). Diet 3 was supplemented with 157 g per 1000 kg feed of *Marrubium vulgare*.

Day-old male Ross 308 chicks were obtained from a commercial hatchery. On arrival, 480 chicks were allocated to 24 floor pens, twenty birds in each pen. Each of the pens has a solid floor with an area of 150×140 cm that was covered with a bedding material (wood shavings). Birds received one of the 3 experimental diets. Feed and water were offered ad libitum to birds throughout the experiment.

Each of the 3 treatments (diets 1 to 3 described above) was offered to birds in 8 pens in a randomized block design. Information on growth and feed intake were obtained from day old to 14 days of age. The room temperature was approximately 32° C., at day old, and was gradually reduced to 20° C. at the end of the 21-day feeding period. A standard lighting program for broilers was used. The birds were weighed at the beginning (at day old) and at 14-day age, feed efficiency was determined.

Figure 9:
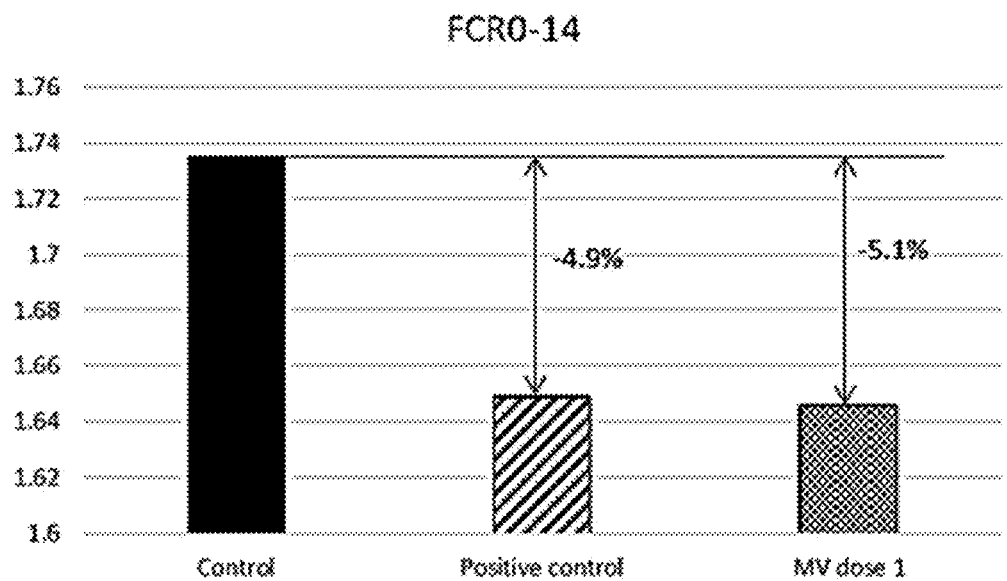
FIG. 9 illustrates that the dietary inclusion of 157 ppm of *Marrubium vulgare* aerial parts improved feed efficiency as measured by feed conversion ratio in chickens compared to a negative control and a positive control. The negative control is the diet with no feed additive. The positive control is the same diet with inclusion of a technology considered as a standard for alternative to antibiotic growth promoters. Values shown in the figure are averages.

The results are summarized in FIG. 9. Feed efficiency was estimated using the feed conversion ratio. The main results are summarized. The inclusion of 100 g per metric ton of XTRACT® Evolution-B, Code X60-6930, improved feed efficiency over control magnitude. The inclusion of *Marrubium vulgare* additionally enhanced the performance of chickens as feed efficiency was improved by 5.1% over control.

Example 6

In this example, different botanical parts (heartwood, bark, sapwood, branches of 2.5 cm of diameter and leaves) of the same plant (*Guaiacum sanctum*) were evaluated for their Total Lignans, Furoguaiacin and Guaiacin contents.

Plant samples were ground to a fine powder and extracted with 80% v/v ethanol for 2×15 min in an ultrasonic bath using a drug:solvent ratio of 1:50. The crude extract was centrifuged for 5 min at 14,500 rpm and the supernatant was used directly for High Performance Liquid Chromatography (HPLC) analysis.

The HPLC system was equipped with an autosampler and a diode array detector. As stationary phase a column packed with octadecylsilyl silica gel for chromatography (e.g., Zorbax SB—C18 4.6*250 mm, 5 μm) was used. The mobile phases consisted in Solvent A (5% acetic acid) and solvent B (acetonitrile/methanol 50/50 (v/v)). A linear gradient was applied with a flow rate of 1.5 ml/min. First, detection of the lignan peaks was carried out at 220, 280 and 320 nm. For the determination of the Total Lignans content, all lignan peaks in the chromatograms were identified by their UV-spectra which consist of either two or three maxima values at 238, 280 and at 230, 280 and 320 nm. For the quantification, the sum of the lignan peak areas was calculated by using nordihydroguaiaretic acid (NDGA) as external standard, since the UV spectrum of NDGA is like the spectra of *Guaiacum* lignans. As reference compounds, NDGA (Sigma Aldrich, art. No. 74540), guaiacin (ambinter, c/o Greenpharma; No. amb35820270) and vanillin (Sigma Aldrich, No. V1104) were used. Of all relevant peaks in the HPLC chromatograms, the UV spectrum was determined. Obtained UV spectra were then compared to known UV spectra, i.e., spectra published in the literature or spectra obtained with the reference compounds. Based on similarities of the spectra, peak identification or at least the allocation to specific substance classes was carried out. To verify UV spectrum similarity, the spectra of the peaks were overlaid with the spectrum of the reference compounds (vanillin, guaiacin). The degree of similarity was then calculated by the HPLC software. Quantification of the lignans was carried out using NDGA as reference compound.

Figure 10:
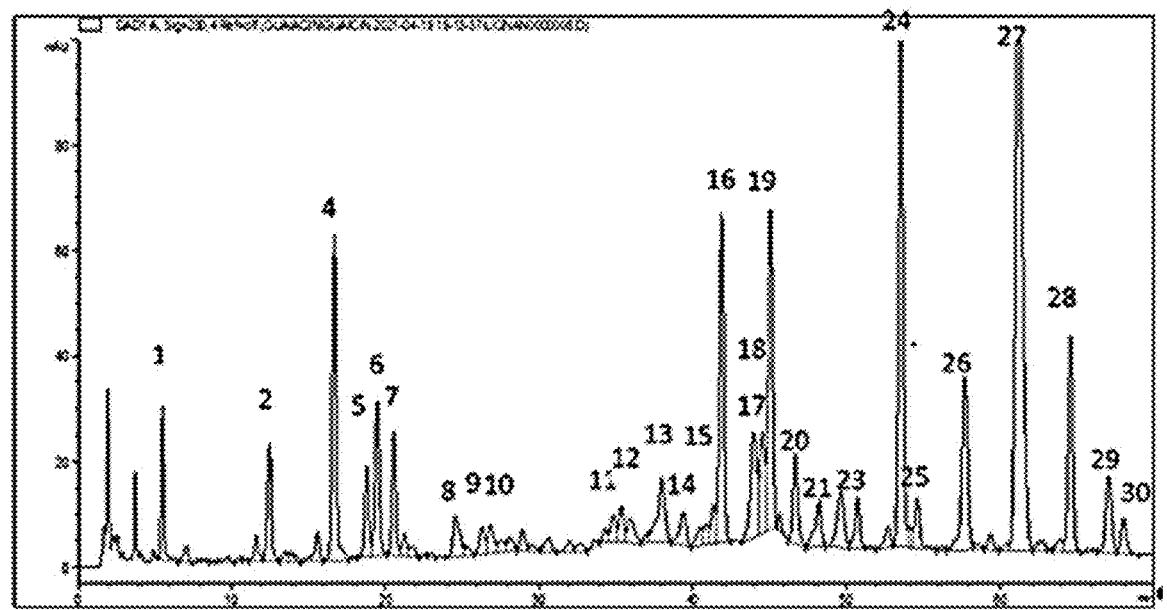
FIG. 10 shows the HPLC chromatogram of GS heartwood. The numbers above the peaks are associated with the compounds as explained. Retention time for peaks in minutes shown in parentheses. Peaks 1 (5.519), 3 (15.576), 6 (19.474), and 8 (24.551): Vanillin-like; Peaks 2 (12.480) and 17 (43.972): Guaiaretic acid like; Peaks 4 (16.694), 9

The results showed the composition of the lignan fraction of different botanical parts of *Guaiacum sanctum*. For example, the HPLC chromatograms of FIG. 10 and FIG. 11 show the lignan composition in the heartwood and branches, respectively. FIG. 12 shows the total lignans concentrations of the botanical parts of *Guaiacum sanctum*. The concentration in the branches is lower by a factor of 2-3 compared to the heartwood, but still higher than in the other *Guaiacum sanctum* parts (sapwood, bark); no relevant lignan content was observed in the leaves. Finally, FIG. 13 presents the composition of the total lignans fraction in terms of Furoguaiacin-like compounds, Guaiacin-like compounds and Guaiaretic acid-like compounds. Surprisingly, the lignan profile in the branches is quite similar to the one found in the heartwood.

Example 7

This example is used to illustrate the total Lignans standardized with Furoguaiacin-like compounds and Guaiacin-like compounds on performance of farm animals.

The study evaluated the effect of increasing dietary inclusion of total lignans standardized in Furoguaiacin-like compounds and Guaiacin-like compounds when fed to broiler chickens from 1 to 28 days of age on growth performance, feed intake and feed efficiency (measured by feed conversion ratio). Treatments included two control diets and one experimental diet.

The basal diet composition was the following (expressed in kg/100 kg): corn 35.00, Oats 14.00, Barley 7.00, vegetable oil 6.00, corn gluten meal 1.00, Soybean meal 29.00, rapeseed meal 3.00, monocalcium phosphate 1.80, limestone 0.40, NaCl 0.40, Lysine 0.50, Methionine 0.60 and a premixture containing other minerals and vitamins 0.500. The nutritional composition of Diet 1 was 12.878 MJ/kg, crude protein 22.094%, crude fat 8.681%, fiber 4.203%, Lysine 1.559%, Methionine 0.7907%.

The treatments were obtained by supplementing the basal diet with a compound. Diet 1 acted as a negative control and did not include any compound. Diet 2 acted as a positive control diet; it included 100 g per metric ton of XTRACT® Evolution-B, Code X60-6930, a product accepted as an alternative to antibiotic growth promoter (EFSA Journal, 2015). Diet 3 was Diet 1 supplemented with 8 g per metric ton of Total Lignans composed of 50% Furoguaiacin-like compounds and 40% Guaiacin-like compounds.

Approximately 400 1-day-old male Ross 308 chicks were obtained from a commercial hatchery. On arrival, 400 chicks were allocated to 20 floor pens, twenty birds in each pen. Each of the pens has a solid floor with an area of 150×140 cm that was covered with a bedding material (wood shavings). Birds received one of the 3 experimental diets. Feed and water were offered ad libitum to birds throughout the experiment.

Each of the 3 treatments (diets 1 to 3 described above) was offered to birds in 8 pens in a randomized block design. Information on growth and feed intake were obtained from day old to 28 days of age. The room temperature was approximately 32° C., at day old, and was gradually reduced to 20° C. at the end of the 21-day feeding period. A standard lighting program for broilers was used. The birds were weighed at the beginning (at day old), at 14-day age and at the end (28 day old) of the study, and the weight gain and feed efficiency were determined.

The results are summarized in FIG. 14. Feed efficiency was estimated using the feed conversion ratio. The main results are that: 1) The inclusion of 100 g per metric ton of XTRACT® Evolution-B, Code X60-6930 improved feed efficiency in a magnitude similar to published information on this product. For example, Bravo et al. (*J. Appl. Poul. Res.* 20:115-120, 2009) showed that the addition of the same dose of the same product on chickens improved feed efficiency by 2.28% (feed conversion: 1.75 vs. 1.79 at 34 days of age). In the present study, the same product improved feed efficiency by 2.2% (feed conversion: 1.60 vs. 1.57 at 28 days of age); and 2) The inclusion of 8 ppm of Total Lignans composed of 50% Furoguaiacin-like compounds and 40% Guaiacin-like compounds significantly improved the performance of chickens. Feed efficiency was improved by 4.7% (feed conversion: 1.52 vs. 1.60).

Example 8

In this example, the effect of increasing dose of Total Lignans standardized on Furoguaiacin-like compounds and Guaiacin-like compounds on anti-inflammatory cytokines in vitro is described. The anti-inflammatory effect, i.e., the inhibitory effect on cytokine release of a 70% v/v ethanolic *Guaiacum sanctum* extract, standardized in Total Lignans, Furoguaiacin and Guaiacin was determined using the THP-1 human monocytic cell line which were differentiated into macrophage-like cells by phorbol myristate acetate (PMA). Prior to the assay the potential cytotoxic effect of the test compounds was determined using the MTT (3-(4,5-dimethylthiazol-2-yl)-2,5-diphenyltetrazolium bromide) assay for determining mitochondrial dehydrogenase activities in the living cells. The anti-inflammatory effect on cytokine release in the THP-1 macrophage cells was measured by incubating the cells with three concentrations of the guaiac extract followed by the addition of LPS to stimulate the cytokine production. After 24 h the amount of TNF-alpha, IL-1 beta and IL-6 was determined in the supernatant of the cell cultures by capture ELISA using commercial kits.

The main results are: 1) Increasing doses of Total Lignans standardized on Furoguaiacin-like compounds and Guaiacin-like compounds reduced the production of the inflammatory cytokine TNFα (see FIG. 15); 2) Increasing doses of Total Lignans standardized on Furoguaiacin-like compounds and Guaiacin-like compounds reduced the production of the inflammatory cytokine IL6 (see FIG. 16); and 3) Increasing doses of Total Lignans standardized on Furoguaiacin-like compounds and Guaiacin-like compounds reduced the production of the inflammatory cytokine IL1β (see FIG. 17).

Example 9

In this example, the effect of increasing dose of Total Lignans standardized on Furoguaiacin-like compounds and Guaiacin-like compounds on markers of osteoarthritis was evaluated in an in vitro cell based assay.

Chondrocytes were seeded in 96-well plates and cultured for 24 hours in culture medium. The culture medium was composed of Dulbecco's modified Eagle's medium supplemented with 4 mM L-glutamine, 50 U/mL Penicillin and 50 m/mL Streptomycin, 10% fetal calf serum. The medium was then removed and replaced by assay medium containing or not (control) the test compounds or the references (dexamethasone at 0.1 µM for MMP-3 and indomethacin at 1 µM for PGE2) and the cells were pre-incubated for 24 hours. The assay medium was composed of Dulbecco's modified Eagle's medium supplemented with 4 mM L-glutamine, 50 U/mL Penicillin and 50 µg/mL Streptomycin, 2% fetal calf serum. After the pre-incubation, the medium was removed and replaced by assay medium containing or not (control) the test compounds or the references in presence of the mix of cytokines (IL-1β+TNF-α+IFN-γ+IL-6 at 3 ng/ml each) and the cells were incubated for 48 hours. A non-stimulated control was performed in parallel. All experimental conditions were performed in n=3.

At the end of incubation, the supernatants were collected for the quantification of the release of an inflammatory marker Prostaglandin E2 (PGE2) as well as the level of a matrix-degrading enzyme (MMP-3, a metalloprotease involved in cartilage degradation) were determined using specific ELISA kits according to the supplier's instructions. The assay kits were Enzo Life Sciences, Ref. ADI-901-001 (for PGE2) and R&D Systems, Ref. DY513 (for MMP-3).

The results were the following. Increasing doses of Total Lignans standardized on Furoguaiacin-like compounds and Guaiacin-like compounds (0.5, 1 and 5 µg/mL) decreased PGE2 production (FIG. 18) and reduced matrix metalloproteinase-3 (FIG. 19).

Example 10

This study evaluated the effect inclusion of extracts from *Guaiacum sanctum* and *Marrubium vulgare* 70 ppm of each extract (defined as PP2) when fed to broilers chicken from 1 to 42 days of age on growth performance, feed intake and feed conversion ratio. Treatments included one control diet and 4 treatment diets with different color codes. Control Diet without any additive; Experimental diet 1 with Supplant D; Experimental Diet 2 PP2; Experimental Diet 3 PP2+Supplant D; Experimental Diet 4 PP2+Eugenol. In the study feeding program with different phases was included: Starter Feed 0-14 days; Grower Feed 14-28 days; Finisher feed 28-42 days.

TABLE 2

| | INGREDIENT AMOUNTS % | | | | |
|---|---|---|---|---|---|
| | Control Diet | Experimental Diet 1 Supplant 2 | Experimental Diet 2 PP2 | Experimental Diet 3 Supplant D + PP2 | Experimental Diet 4 Supplant D + PP2 |
| BASAL STARTER DIET | | | | | |
| Fine Corn 7.1% | 60.45 | 60.45 | 60.45 | 60.45 | 60.45 |
| Soyabean Meal 47% | 35 | 35 | 35 | 35 | 35 |
| Soyabean Oil | 0.34 | 0.34 | 0.34 | 0.34 | 0.34 |
| Calcium Chloride | 1.14 | 1.14 | 1.14 | 1.14 | 1.14 |
| MonoCalcium Phosphate 21% | 0.85 | 0.85 | 0.85 | 0.85 | 0.85 |
| Salt | 0.27 | 0.27 | 0.27 | 0.27 | 0.27 |
| L-Lysine | 0.25 | 0.25 | 0.25 | 0.25 | 0.25 |
| DL-Methonine | 0.38 | 0.38 | 0.38 | 0.38 | 0.38 |
| Illinois Poultry Vitamin PMX | 0.57 | 0.57 | 0.57 | 0.57 | 0.57 |
| Illinois Poultry Trace PMX | 0.25 | 0.25 | 0.25 | 0.25 | 0.25 |
| SUPPLANT D DILUTION | 0 | 0.01 | 0 | 0.01 | 0 |
| PP2 BLEND | 0 | 0 | 0.01 | 0.01 | 0.01 |
| EUEGENOL F DILUTION | 0 | 0 | 0 | | 0.125 |
| NUTRITIONAL COMPOSITION | | | | | |
| Crude Protein (Min) % | 20.57 | 20.57 | 20.57 | 20.57 | 20.57 |
| Lysine (Min) % | 1.33 | 1.33 | 1.33 | 1.33 | 1.33 |
| Methionine (Min) % | 0.65 | 0.65 | 0.65 | 0.65 | 0.65 |
| Crude Fat (Min) % | 3.2 | 3.2 | 3.2 | 3.2 | 3.2 |
| BASAL GROWER DIET | | | | | |
| Fine Corn 7.1% | 63.71 | 63.71 | 63.71 | 63.71 | 63.71 |
| Soyabean Meal 47% | 31.7 | 31.7 | 31.7 | 31.7 | 31.7 |
| Soyabean Oil | 1.37 | 1.37 | 1.37 | 1.37 | 1.37 |
| Calcium Chloride | 1.17 | 1.17 | 1.17 | 1.17 | 1.17 |
| MonoCalcium Phosphate 21% | 0.66 | 0.66 | 0.66 | 0.66 | 0.66 |
| Salt | 0.28 | 0.28 | 0.28 | 0.28 | 0.28 |
| L-Lysine | 0.2 | 0.2 | 0.2 | 0.2 | 0.2 |
| DL-Methonine | 0.33 | 0.33 | 0.33 | 0.33 | 0.33 |
| K Broiler Vitamin PMX | 0.04 | 0.04 | 0.04 | 0.04 | 0.04 |
| K Broiler Trace PMX | 0.08 | 0.08 | 0.08 | 0.08 | 0.08 |
| SUPPLANT D DILUTION | 0 | 0.1 | 0 | 0.1 | 0 |
| PP2 BLEND | 0 | 0 | 0.1 | 0.1 | 0.1 |
| EUEGENOL F DILUTION | 0 | 0 | 0 | | 0.125 |
| NUTRITIONAL COMPOSITION | | | | | |
| Crude Protein (Min) % | 20.21 | 20.21 | 20.21 | 20.21 | 20.21 |
| Lysine (Min) % | 1.268 | 1.268 | 1.268 | 1.268 | 1.268 |
| Methionine (Min) % | 0.626 | 0.626 | 0.626 | 0.626 | 0.626 |
| Crude Fat (Min) % | 4.42 | 4.42 | 4.42 | 4.42 | 4.42 |
| BASAL FINISHER DIET | | | | | |
| Fine Corn 7.1% | 68.16 | 68.16 | 68.16 | 68.16 | 68.16 |
| Soyabean Meal 47% | 27.6 | 27.6 | 27.6 | 27.6 | 27.6 |
| Soyabean Oil | 1.46 | 1.46 | 1.46 | 1.46 | 1.46 |
| Calcium Chloride | 1.05 | 1.05 | 1.05 | 1.05 | 1.05 |
| MonoCalcium Phosphate 21% | 0.48 | 0.48 | 0.48 | 0.48 | 0.48 |
| Salt | 0.27 | 0.27 | 0.27 | 0.27 | 0.27 |
| L-Lysine | 0.17 | 0.17 | 0.17 | 0.17 | 0.17 |
| DL-Methonine | 0.29 | 0.29 | 0.29 | 0.29 | 0.29 |
| Illinois Poultry Vitamin PMX | 0.04 | 0.04 | 0.04 | 0.04 | 0.04 |
| Illinois Poultry Trace PMX | 0.08 | 0.08 | 0.08 | 0.08 | 0.08 |
| SUPPLANT D DILUTION | 0 | 0.1 | 0 | 0.1 | 0 |
| PP2 BLEND | 0 | 0 | 0.1 | 0.1 | 0.1 |
| EUEGENOL F DILUTION | 0 | 0 | 0 | | 0.125 |
| NUTRITIONAL COMPOSITION | | | | | |
| Crude Protein (Min) % | 18.53 | 18.53 | 18.53 | 18.53 | 18.53 |
| Lysine (Min) % | 1.137 | 1.137 | 1.137 | 1.137 | 1.137 |

TABLE 2-continued

| | | INGREDIENT AMOUNTS % | | | |
|---|---|---|---|---|---|
| | Control Diet | Experimental Diet 1 Supplant 2 | Experimental Diet 2 PP2 | Experimental Diet 3 Supplant D + PP2 | Experimental Diet 4 Supplant D + PP2 |
| Methionine (Min) % | 0.57 | 0.57 | 0.57 | 0.57 | 0.57 |
| Crude Fat (Min) % | 4.55 | 4.55 | 4.55 | 4.55 | 4.55 |

The treatments were obtained by supplementing the basal diet with a compound or combination of compounds. Diet 1 acted as a negative control and did not include any compound. Diet 2 acted as a positive control diet; it included 100 g per metric ton of SUPPLANT D, a product that has been developed as Growth promoter. Diet 3 was Diet 1 supplemented with a combination of 70 gm of each, *Guaiacum sanctum* and *Marrubium vulgare* extract. Diet 4 was Diet 1 supplemented with a combination of 70 gm of each, *Guaiacum sanctum* and *Marrubium vulgare* extract and 100 g per metric ton of Supplant D. Diet 5 was Diet 2 supplemented with 10 g per metric Ton of Eugenol.

Test Methods
Number of Birds, Allotment, Pens, Feed, Water, Lighting and Vaccination A total 1,860 newly hatched (d 0) Ross 708 male birds were procured from a commercial hatchery. After day 7, 360 birds per treatments were relocated with 12 replicates for each treatment and 31 birds for each replicate per treatment.

Allotment
Birds were randomly assigned to pens and blocked throughout the barn. Blocks were represented as colored pens and treatments were color listed beside the pen. Treatments had 12 replicate pens for each treatment. All the pens had 31 birds, placed at d0 of the trial. At d7, all pens were recounted to 30 birds per pen. Pens that had lost more than one bird per pen, needed birds were replaced from the extras that have been fed the same treatment from days 1-7.

Pens, Feed, and Water
All the pens in the study contain dirt litter (from previous flocks—all litter were removed from pens, mixed, and then reallotted to the pens in the present study). Starter feed (0-14 days) was fed as mash and the rest phases were fed as pallet, provided by University of Illinois Feed Mill and Kalmbach Feed Inc. Water was provided ad libitum for all the treatments.

Lighting
From 0-8 days, birds were exposed to 24 hours of full intensity light. From 9-25 days, the lighting program was altered to provide 16 hours of light and 8 hours of darkness and from day 24 to day 42, 18 hours of light was offered.

Vaccination
All the birds were vaccinated for Marek's and Infectious Bronchitis/New Castle disease at the hatchery. Additionally, birds were also vaccinated for coccidia at the hatchery.

Each of the 5 treatments (diets 1 to 5 described above) was offered to birds in 60 pens in a randomized block design. Information on growth and feed intake were obtained from day 0 to 42 days of age. The following data was collected: 1. Pen weights at day 0, 7, 14, 21, 28 and 42; 2. Feed addition, consumption, and removal by phase; 3. Average daily gain, feed intake and feed conversion by pen, from 0-14, 0-28 and 0/42 days; 4. Mortality, cause of mortality and removal.

Results
Starter Phase
As described previously, all the birds in all the treatments were fed with mash starter feed. As mentioned above, body weight gain, feed intake and Feed conversion ratio (FCR) were calculated. Based on the mortality, FCR was adjusted. The data obtained for the Starter phase is shown below.

TABLE 3

| | | D 14 Pen Wt | 0-14 d Pen Gain | 0-14 d Avg Bird Wt | 0-14 d Pen Intake | 0-14 d FCR | Mort Adj FCR |
|---|---|---|---|---|---|---|---|
| CONTROL DIET | MEAN | 19.733 | 16.805 | 0.661 | 15.367 | 0.9115 | 0.906 |
| | STD DEV | 1.045 | 1.05 | 0.034 | 1.062 | 0.05 | 0.048 |
| | CV | 5.294 | 6.249 | 5.203 | 6.911 | 5.421 | 5.275 |
| EXPERIMENTAL DIET1 | MEAN | 19.442 | 16.51 | 0.652 | 15.333 | 0.928 | 0.914 |
| | STD DEV | 0.939 | 0.942 | 0.027 | 1.301 | 0.039 | 0.037 |
| | CV | 4.827 | 5.708 | 4.136 | 8.482 | 4.173 | 4.008 |
| EXPERIMENTAL DIET2 | MEAN | 18.25 | 15.329 | 0.614 | 14.358 | 0.937 | 0.927 |
| | STD DEV | 0.873 | 0.873 | 0.032 | 1.167 | 0.07 | 0.07 |
| | CV | 4.785 | 5.698 | 5.284 | 8.13 | 7.459 | 7.584 |
| EXPERIMENTAL DIET3 | MEAN | 19.308 | 16.388 | 0.647 | 14.833 | 0.906 | 0.898 |
| | STD DEV | 1.398 | 1.385 | 0.046 | 1.619 | 0.076 | 0.075 |
| | CV | 7.239 | 8.451 | 7.051 | 10.917 | 8.35 | 8.395 |
| EXPERIMENTAL DIET4 | MEAN | 18.767 | 15.841 | 0.639 | 14.933 | 0.945 | 0.929 |
| | STD DEV | 1.431 | 1.414 | 0.037 | 1.477 | 0.079 | 0.07 |
| | CV | 7.625 | 8.927 | 5.847 | 9.889 | 8.402 | 7.785 |

The results of the 0-14 day average bird weight is shown in FIG. 20, and the results of the 0-14 day mortality adjusted FCR is shown in FIG. 21. From the results for average body weight of the birds and mortality adjusted FCR for 0-14 day, no clear numerical trend can be observed. This agrees with the fact that phytogenic molecule needs 3-4 weeks to exert their effect on physiological response and hence the zootechnical parameters. In the first two week of the trial a possible synergistic effect between PP2 and Supplant D can be observed in mortality adjusted FCR.

Grower Phase

All the birds were fed with the respective feeds in Pellet form. Table 4 below with different parameters for the grower phase is shown below.

TABLE 4

|  |  | D 28 Pen Wt | 0-28 d Pen Gain | 0-28 d Avg Bird Wt | 0-28 d Pen Intake | 0-28 d FCR | Mort Adj FCR |
|---|---|---|---|---|---|---|---|
| CONTROL DIET | MEAN | 83.2 | 80.272 | 2.868 | 96.508 | 1.203 | 1.188 |
|  | STD DEV | 5.554 | 5.541 | 0.143 | 5.725 | 0.022 | 0.018 |
|  | CV | 6.667 | 6.902 | 4.976 | 5.932 | 1.83 | 1.537 |
| EXPERIMENTAL DIET1 | MEAN | 87.783 | 84.852 | 3.053 | 100.625 | 1.185 | 1.167 |
|  | STD DEV | 3.493 | 3.504 | 0.056 | 5.924 | 0.034 | 0.035 |
|  | CV | 3.979 | 4.13 | 1.834 | 5.887 | 2.855 | 3.000 |
| EXPERIMENTAL DIET2 | MEAN | 78.94 | 78.94 | 2.921 | 91.4 | 1.158 | 1.131 |
|  | STD DEV | 3.18 | 3.161 | 0.061 | 3.795 | 0.016 | 0.019 |
|  | CV | 3.888 | 3.888 | 4.004 | 2.077 | 4.152 | 1.407 |
| EXPERIMENTAL DIET3 | MEAN | 88.904 | 85.983 | 3.039 | 99.558 | 1.158 | 1.146 |
|  | STD DEV | 5.523 | 5.513 | 0.154 | 6.345 | 0.014 | 0.018 |
|  | CV | 6.212 | 6.411 | 5.077 | 6.373 | 1.223 | 1.57 |
| EXPERIMENTAL DIET4 | MEAN | 86.842 | 83.916 | 3.046 | 98.875 | 1.179 | 1.164 |
|  | STD DEV | 4.731 | 4.734 | 0.088 | 5.031 | 0.027 | 0.02 |
|  | CV | 5.448 | 5.641 | 2.875 | 5.088 | 2.26 | 1.677 |

The results of the 0-28 day average body weight is shown in FIG. 22, and the Results of the 0-28 day mortality adjusted FCR is shown in FIG. 23. As can be seen from the results, all the experimental diets (2, 3, and 4) have positive effect on mortality adjusted FCR at the end of day 28. Experimental diet 1 containing Supplant D shows an improvement of 1.78% when compared to the control diet. Experimental diets 2, 3 and 4 show improvements in mortality adjusted FCR by 4.8%, 3.53% and 2.14% respectively. The response of treatment 3 is of great importance as it shows the same response as was reported in the previous trial where the percentage improvement in FCR was 4.2.

Finisher Phase

A summary of the 0-42 day data are shown in Table 5 below.

The inclusion of 136 g per metric ton of Supplant D shows numerical improvement in FCR. In the present study, the same product improved feed efficiency by nearly 2.0% (feed conversion: 1.19 vs. 1.17 at 28 days of age). The inclusion of extracts from *Guaiacum sanctum* and *Marrubium vulgare* 70 ppm of each extract (defined as PP2) significantly improved the performance of the birds at day 28 and day 42 by improving FCR by 4.8 and 2.7% respectively. Combination of the Extracts of *Guaiacum sanctum* and *Marrubium vulgare* alone or in combination with other compounds have a positive effect on the performance of the bird.

Example 11

An evaluation of the effect of feeding different feed products from day of age through 42 days of age on live

TABLE 5

|  |  | D 42 Pen Wt | 0-42 d Pen Gain | 0-42 d Avg Bird Wt | 0-42 d Pen Intake | 0-42 d FCR | Mort Adj FCR |
|---|---|---|---|---|---|---|---|
| CONTROL DIET | MEAN | 177.5417 | 174.6133 | 6.316988 | 214.95 | 1.232249 | 1.204975 |
|  | STD DEV | 12.6426 | 12.64158 | 0.174191 | 13.49023 | 0.036701 | 0.022676 |
|  | CV | 7.120921 | 7.239756 | 2.757495 | 6.275986 | 2.978365 | 1.88185 |
| EXPERIMENTAL DIET1 | MEAN | 180.1583 | 177.2267 | 6.51153 | 218.2917 | 1.231306 | 1.192949 |
|  | STD DEV | 7.531323 | 7.553044 | 0.130312 | 13.15436 | 0.04386 | 0.027033 |
|  | CV | 4.180391 | 4.261799 | 2.001248 | 6.026048 | 3.56206 | 2.266042 |
| EXPERIMENTAL DIET2 | MEAN | 180.45 | 177.5292 | 6.3489 | 212.0833 | 1.194847 | 1.176291 |
|  | STD DEV | 8.480834 | 8.460416 | 0.151071 | 9.557561 | 0.014333 | 0.013721 |
|  | CV | 4.699825 | 4.765649 | 2.379482 | 4.506512 | 1.199588 | 1.166451 |
| EXPERIMENTAL DIET3 | MEAN | 181.0083 | 178.0875 | 6.424383 | 218.1833 | 1.225439 | 1.199524 |
|  | STD DEV | 9.632941 | 9.629605 | 0.212363 | 11.62324 | 0.028164 | 0.021703 |
|  | CV | 5.321822 | 5.407232 | 3.305582 | 5.327281 | 2.298318 | 1.809334 |
| EXPERIMENTAL DIET4 | MEAN | 178.7 | 175.7742 | 6.499686 | 214.425 | 1.219871 | 1.188733 |
|  | STD DEV | 8.11228 | 8.115298 | 0.145381 | 10.5279 | 0.01742 | 0.020569 |
|  | CV | 4.539608 | 4.616889 | 2.236746 | 4.909827 | 1.428013 | 1.730311 |

The results of the 0-42 day average body weight is shown in FIG. 24, and the Results of the 0-42 day mortality adjusted FCR is shown in FIG. 25. At day 42, all the experimental diets show numerical improvement in the feed conversion ratio, when compared to the control group. Experimental diet 2 with PP2 has major improvement on FCR at day 42. Experimental diet 2 shows an improvement by 2.4% compared to the control Group. PP2 in combination with Supplant D (experimental diet 3) and with eugenol (experimental diet 4) also shows improvement in FCR. This data suggests that PP2 alone and/or in combination with other compounds for example carvacrol, cinnamaldehyde and capsaicin (components of Supplant D) and Eugenol have positive effect on zootechnical parameters of the birds.

production variables. The objective of this study was to measure the performance parameters of live weight gain, feed conversion, and mortality of broilers raised in floor pens with a coccidiosis vaccine and different products. The experiment will consist of 78 pens of 50 male broiler chickens. The treatments will be replicated in 13 blocks; the 6 treatments will be randomized within each block. A randomization procedure for pen assignment for treatments and blocks will be done. The pen diagram and treatment assignment will be included with the source data. The treatments are shown below in Table 6.

TABLE 6

| Treatment | Dose (lb/us ton) | | | # Reps | # birds |
| --- | --- | --- | --- | --- | --- |
| | Starter | Grower | Finisher | | |
| 1. Control | — | — | — | 13 | 50 |
| 2. Plant 1 | 0.134 | 0.134 | 0.134 | 13 | 50 |
| 3. Plant 2 | 0.314 | 0.314 | 0.314 | 13 | 50 |
| 4. Plant 1 and Plant 2 | 0.14 each | 0.14 each | 0.14 each | 13 | 50 |
| 5. Supplant D 0.3 lbs/ton | 0.30 | 0.30 | 0.30 | 13 | 50 |
| 6. Supplant D 0.15 lbs/ton | 0.15 | 0.15 | 0.15 | 13 | 50 |

Diets

Southern Poultry Research, Inc. will provide all feeds. All basal feeds will be manufactured at SPFR Feed Mill. Feed formulations will be provided in the source data. The test articles will be applied according to the procedure described in Treatments section. All feeds will be fed as crumbles/pellets. Quantities of all basal feed and test articles used to prepare treatment batches will be documented. All test articles will be mixed to assure a uniform distribution. Each batch of feed will be mixed and bagged separately. Each bag will be identified with the study number, date of mix, type of feed, and the correct treatment number. Complete records of feed mixing, and test article inventories will be maintained.

Feed Samples

A sample from the beginning, middle, and end of each treatment feed will be mixed to form a composite sample. Samples will be taken from the composite for each treatment. One sample of each treatment will be taken.

Feeding Schedule

Feed will be weighed by pen. Starter will be fed from DOT 0 to 14. On DOT 14, non-consumed Starter will be weighed and discarded. Grower will be issued and fed until DOT 28. On DOT 28, non-consumed Grower will be weighed and discarded. Finisher will be issued and fed until DOT 42. On DOT 42, non-consumed Finisher feed will be weighed and discarded.

Birds

Day of hatch male chicks will be obtained from Cobb hatchery, Cleveland, Ga. The strain will be Cobb 500. Breeder flock will be recorded. 3,000 chicks will be allocated to the study. At the hatchery, the birds will receive routine vaccinations. The birds will be sexed at the hatchery. Only healthy appearing chicks will be used in the study. At study initiation 50 males will be allocated to each treatment pen by blocks. No birds will be replaced during the study. Disposition of all birds not used for allocation will be documented. Bird weights by pen will be recorded on DOTs 0, 14, 28, and 42.

Floor Pen Description And Management

The floor pen house is a modified poultry house with dirt floors and curtain sidewalls. The pens will be prepared for use in the study according to SPFR SOP. A diagram of the test facility will be included by SPFR in the source data.

The experimental house is divided into pens of equal size, arranged along a central aisle. The birds will be kept in 60 pens of the house equipped with 80 floor pens, each having an area of 5×10=50 $ft^2$ with built up wood shavings as bedding with thickness of approximately 4 inches. The stocking density, after subtracting out for equipment, will be ~0.95 $ft^2$/bird. Each pen has 5 feet high side walls with bottom 1½ feet being of solid wood to prevent bird migration. All pens will be numbered consecutively and identified on pen cards.

The temperature of the building will be monitored. Environmental conditions during the trial (temperature) will be appropriate (optimum) to the age of the animals. Illumination will be provided by fluorescent bulbs placed above the pens. The lighting scheme will be 24 hours of light per day.

The diets will be provided ad libitum in one tube-type feeder per pen. From day 0 until day 7, feed will also be supplied on a tray placed on the litter of each pen. Water will be provided ad libitum from one per pen Plas son-type automatic watering fount.

Standard floor pen management practices will be used throughout the experiment. Animals and housing facilities will be inspected twice daily, observing and recording the general health status, constant feed and water supply as well as temperature, removing all dead birds, and recognizing unexpected events. Birds found dead during the study will be noted on the Daily Mortality Record, and will not be replaced. Pen number, the date of mortality, sex, weight, and diagnosis will be recorded.

Data Entry And Analysis

Source data will be entered with indelible ink. Entries will be legible, signed or initialed, and dated by the person making the observation entry. Each sheet of source data will be signed by the person(s) attributed to the data. Any mistake or change to the source data will be initialed and dated and a correction code or statement added as to why the change was made. Means from (Day 0-14, 0-35, and 0-42) for pen weight gain, feed consumption, and feed conversion for each feed period will be calculated.

Example 12

Effect of feeding plant 1 and 2 on broiler performance. Total No.: 480; Trial Length: 21 days; Genetics: Ross 308 FF X Yield Plus; No. Treatments: 4; No. Rations: 4; No. Replicates: 12; No. Chicks/Pen: 10/cage.

Chicks had ad libitum access to feed and water. Routine health procedures were followed. Study directors were notified of any therapeutic treatments. A veterinarian was consulted for any therapeutic treatments that are not standard for the unit. Challenge model: Commercial Coccidiosis Vaccine at 10× manufacturer's recommendation orally gavaged at placement. This oral gavage was the 10× coccidiosis vaccine and distilled water for a total of 1 mL gavage. A board was placed near the feeder/drinker in each cage to allow some natural *Eimeria* cycling. A total of 4 diets were fed according to the following feeding protocol for ration use (and treatment identification) (Table 7).

TABLE 7

| | Control | Plant 1 67 ppm/MT | Plant 2 157 ppm/MT | Plant 1 and 2 combo 140 ppm/MT |
| --- | --- | --- | --- | --- |
| Phase 1, D 0-21 | A1 | B1 12.16 g | C1 28.4 g | D1 12.7 g of each plant |

Mash Basal Diets Manufactured at Deal-Rite Feeds (2000 lbs minimum batch size). Trial diets manufactured in cement mixer at trial site. Manufacture 400 lbs of feed per treatment. All diets were fed ad libitum. Observations: Pen weights and feed consumption were recorded on D0, D7, D14, D21; Any unusual observations were noted; Weighed and recorded any deads or removals; Any health event and subsequent treatment were recorded (chick ID, observed health issue). Reports: Raw data—animal weights, feed consumption; Laboratory analyses; Data Summary. Animal Care and Use is the same as normally used in commercial poultry production. Samples: Gut Samples at D21 for 5-10 birds/trt—Use same segments as previous trial; Two samples of each diet will be collected. Two 1-lb samples per diet will be collected. One sample of each diet will be sent to Sure-Tech labs for moisture, crude protein, fat, Ca, P, Cu, Na, Zn, chloride, Mg, and Mn. A sub-sample will be retained.

Data Summary and Statistical Analyses

TABLE 8

| Criterion | Units | Data Summary | Statistical Analysis |
|---|---|---|---|
| Pen live weight 0, 7, 14, 21 d on test | lb | Yes | Mixed |
| Avg. Daily gain 0-7, d on test 7-14, d on test 14-21, d on test 0-14, d on test 0-21, d on test | lb/d | Yes | Mixed |
| Avg. Daily Feed Intake (same periods as ADG) | lb/d | Yes | Mixed |
| Gain/Feed (same periods as ADG) | | Yes | Mixed |
| Feed/Gain (same periods as ADG) | | Yes | Mixed |

Data will be analyzed as a completely randomized design with pen as the experimental unit and blocks based on initial body weight. Analysis of Data will be performed using the Mixed procedures of SAS. The results at 21 days are shown in Table 9 (FCR is Feed Conversion Ratio).

TABLE 9

| 21 Day Broiler Chicken Assay | | | |
|---|---|---|---|
| Treatment | FCR | Body Weight (lbs) | Mortality (%) |
| Control | 1.3170 | 1.6437 | 3.64 |
| Plant 1 (67 ppm) | 1.2854 | 1.6807 | 3.64 |
| Plant 2 (157 ppm) | 1.2859 | 1.6796 | 4.55 |
| Combo (70 ppm each) | 1.2918 | 1.6575 | 4.00 |
| P-value | 0.4815 | 0.6408 | 0.9782 |

To facilitate the understanding of this disclosure, a number of terms are defined below. Terms defined herein have meanings as commonly understood by a person of ordinary skill in the areas relevant to the present disclosure. The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of." As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and/or methods and in the steps or in the sequence of steps of the method described herein without departing from the concept, spirit and scope of the disclosure. For example, all of the disclosed components of the preferred and alternative embodiments are interchangeable providing disclosure herein of many systems having combinations of all the preferred and alternative embodiment components. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims. All such similar substitutes and modifications apparent to those skilled in the art are deemed to be within the spirit, scope and concept of the disclosure as defined by the appended claims.

The invention claimed is:

1. An animal feed composition comprising an added amount of an extract of *Marrubium vulgare* comprising marrubiin, wherein the marrubiin has the chemical structure:

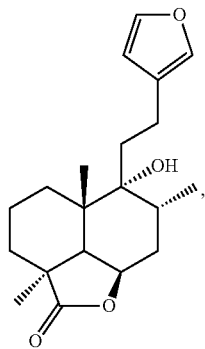

and wherein the composition is further defined as comprising an added amount of an extract of *Guaiacum sanctum* comprising furoguaiacin or guaiacin wherein the added amount of the extract of *Marrubium vulgare* and the extract of *Guaiacum sanctum* is effective to improve the performance of an animal feed to which the extract of *Marrubium vulgare* and the extract of *Guaiacum sanctum* is added compared to when the extract of *Marrubium vulgare* and the extract of *Guaiacum sanctum* is not present in the animal feed.

2. The composition of claim 1, further defined as comprising at least one animal feed component selected from the group consisting of a vitamin, mineral, probiotic, enzyme, flavoring, amino acid, fat, essential oil and preservative, or any combination thereof.

3. The composition of claim 1, wherein the marrubiin is obtained from an extract of the aerial parts of a *Marrubium vulgare* plant.

4. The composition of claim 1, wherein the marrubiin is produced from an extract of stems, leaf, flowers, roots or fruits of a *Marrubium vulgare* plant or part thereof, or any combination thereof.

5. The composition of claim 1, wherein the extract of *Marrubium vulgare* is an aqueous, ethanolic, methanolic, isopropanolic, ethylacetate, acetonic, hexane, or a mixture thereof, or a supercritical $CO_2$ extract.

6. The composition of claim 1, wherein marrubiin comprises at least 0.5% of the composition.

7. The composition of claim 1, wherein the extract of *Guaiacum sanctum* is obtained from heartwood or branches of a *Guaiacum sanctum* plant.

8. The composition of claim 1, wherein the extract of *Guaiacum sanctum* is produced from heartwood, whole trunk, bark, stems, leaf, flowers, branches, roots or fruits of a *Guaiacum sanctum* plant or part thereof, or any combination thereof.

9. The composition of claim 1, wherein the extract of *Guaiacum sanctum* is an aqueous, ethanolic, methanolic, isopropanolic, ethylacetate, acetonic, hexane, or a mixture thereof, or a supercritical $CO_2$ extract.

10. The composition of claim 1, wherein lignans comprise between about 0.5% and about 30% of the composition.

11. The composition of claim 1, wherein lignans comprise at least 9% of the composition.

12. The composition of claim 1, wherein total lignans in the composition comprise at least 20% furoguaiacin and guaiacin.

13. The composition of claim 1, further wherein the guaiacin makes up from about 20% to about 60% of total lignans comprised in said composition by weight.

14. The composition of claim 1, further wherein the furoguaiacin makes up from about 20% to about 60% of total lignans comprised in the composition by weight.

* * * * *